(12) United States Patent
Atsuumi et al.

(10) Patent No.: US 8,848,296 B2
(45) Date of Patent: Sep. 30, 2014

(54) ZOOM LENS, IMAGING DEVICE, AND PORTABLE DIGITAL DEVICE

(71) Applicants: Hiromichi Atsuumi, Yokohama (JP); Yohei Takano, Yokohama (JP)

(72) Inventors: Hiromichi Atsuumi, Yokohama (JP); Yohei Takano, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 58 days.

(21) Appl. No.: 13/777,176

(22) Filed: Feb. 26, 2013

(65) Prior Publication Data

US 2013/0222922 A1 Aug. 29, 2013

(30) Foreign Application Priority Data

Feb. 29, 2012 (JP) ................................ 2012-043599
Mar. 10, 2012 (JP) ................................ 2012-053886

(51) Int. Cl.
*G02B 15/14* (2006.01)
*G02B 15/17* (2006.01)
*G02B 13/00* (2006.01)

(52) U.S. Cl.
CPC .............. *G02B 15/14* (2013.01); *G02B 15/17* (2013.01); *G02B 13/009* (2013.01)
USPC ......................................... 359/683; 359/684

(58) Field of Classification Search
CPC ................................ G02B 15/14; G02B 15/17
USPC ......................................... 359/676, 683, 684
See application file for complete search history.

(56) References Cited

U.S. PATENT DOCUMENTS

| 6,236,516 B1 | 5/2001 | Misaka |
| 2009/0073572 A1 | 3/2009 | Atsuumi |
| 2009/0122418 A1 | 5/2009 | Atsuumi et al. |
| 2009/0135500 A1 | 5/2009 | Sudoh et al. |
| 2009/0147375 A1 | 6/2009 | Sudoh et al. |
| 2010/0238565 A1 | 9/2010 | Takano et al. |
| 2011/0002047 A1 | 1/2011 | Takano et al. |
| 2011/0002048 A1 | 1/2011 | Takano et al. |
| 2011/0109978 A1* | 5/2011 | Yamada et al. ............... 359/684 |
| 2012/0008216 A1 | 1/2012 | Takano et al. |
| 2012/0236419 A1 | 9/2012 | Atsuumi et al. |
| 2012/0307375 A1 | 12/2012 | Takano et al. |
| 2013/0033759 A1 | 2/2013 | Takano et al. |

FOREIGN PATENT DOCUMENTS

| JP | 10-048518 | 2/1998 |
| JP | 4401451 | 11/2009 |

OTHER PUBLICATIONS

U.S. Appl. No. 13/687,373, filed Nov. 28, 2012, Atsuumi, et al.

* cited by examiner

*Primary Examiner* — William Choi
(74) *Attorney, Agent, or Firm* — Oblon, Spivak, McClelland, Maier & Neustadt, L.L.P.

(57) ABSTRACT

A zoom lens includes, in order from an object side along an optical axis, a first lens group having a positive refractive power, a second lens group having a negative refractive power, a third lens group having a negative refractive power, a fourth lens group having a positive refractive power, and a fifth lens group having a positive refractive power, wherein with a change in a magnification from a wide-angle end to a telephoto end, an interval between the first lens group and the second lens group is increased, the interval between the second lens group and the third lens group is changed, the interval between the third lens group and the fourth lens group is decreased, the interval between the fourth lens group and the fifth lens group is decreased, and focusing is performed by the third lens group.

12 Claims, 18 Drawing Sheets

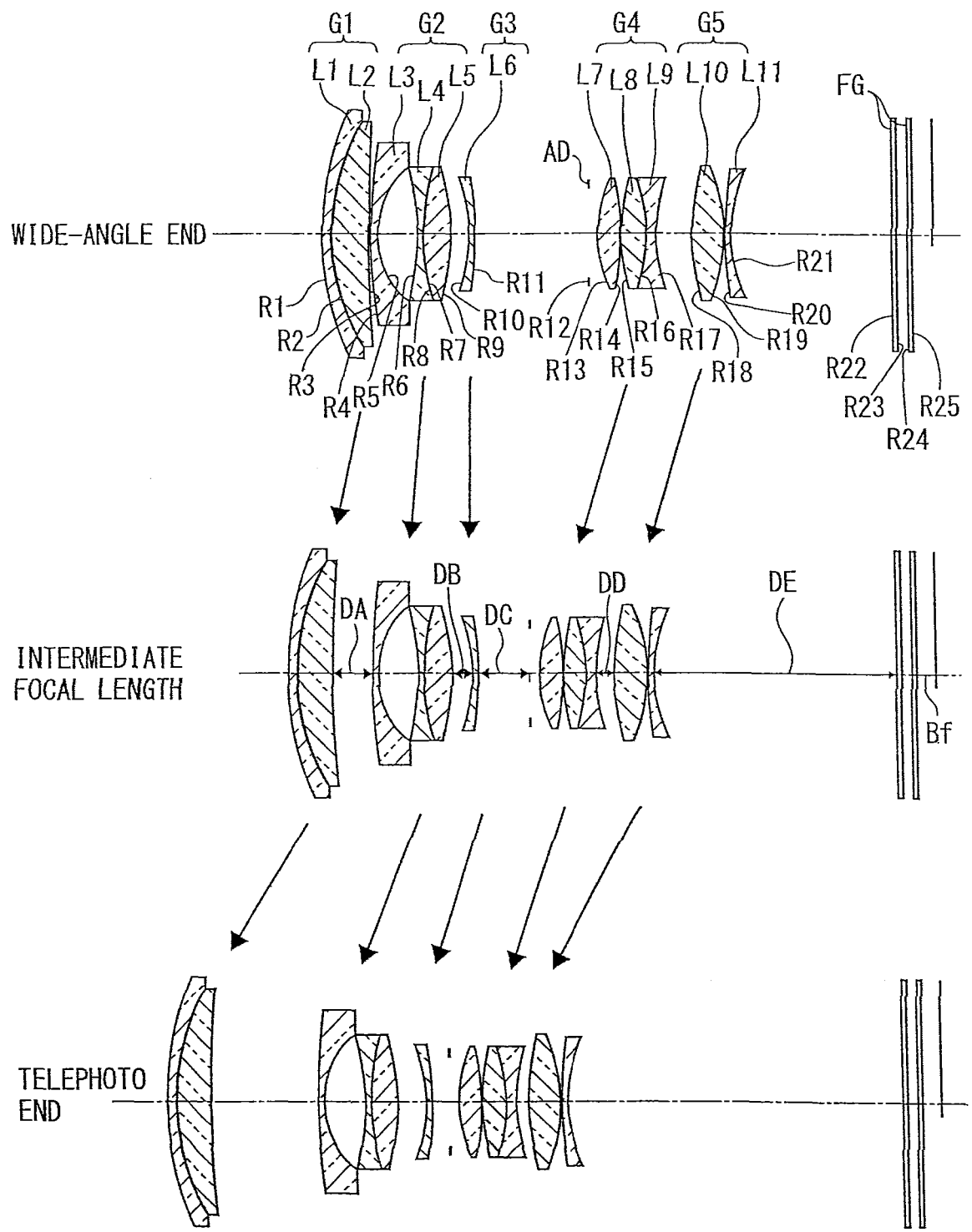

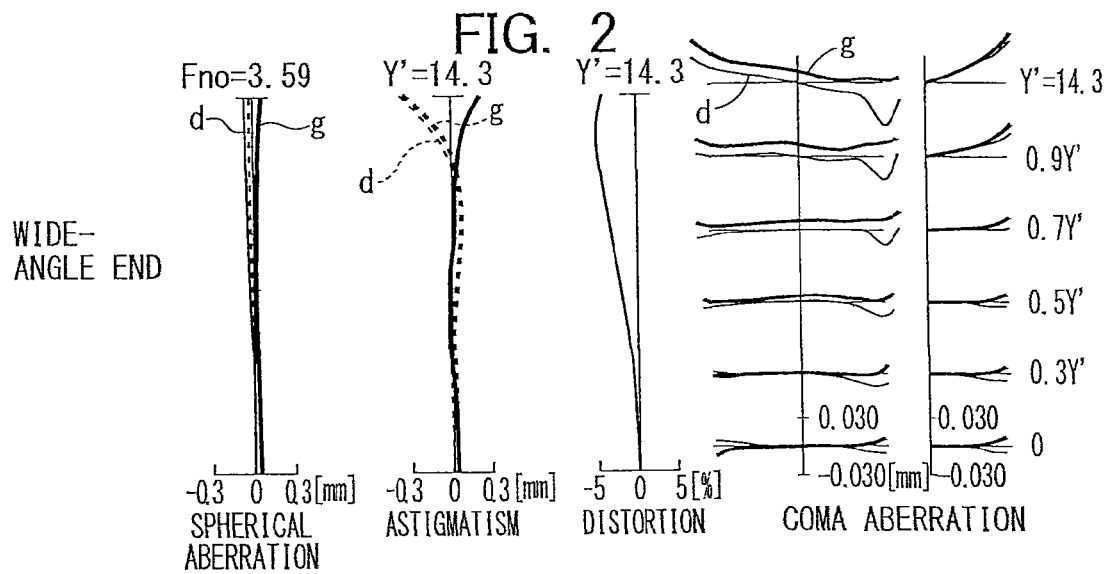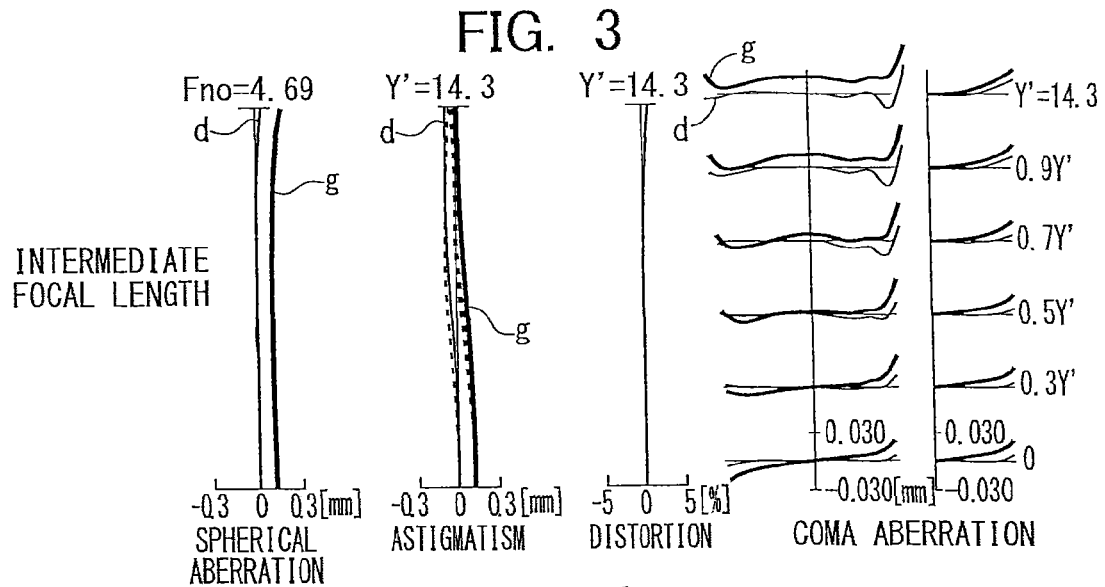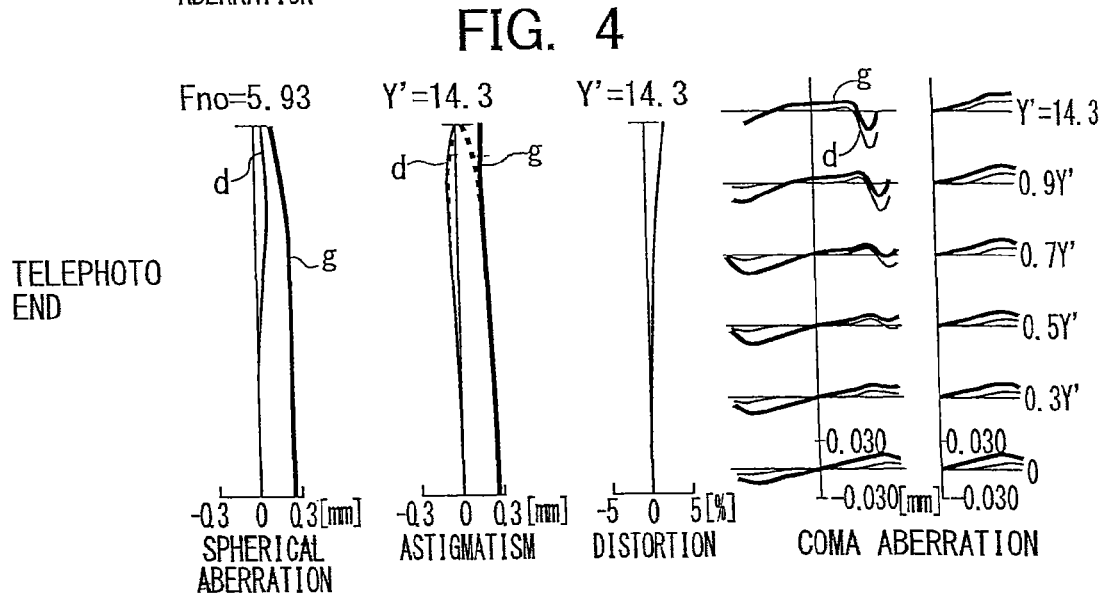

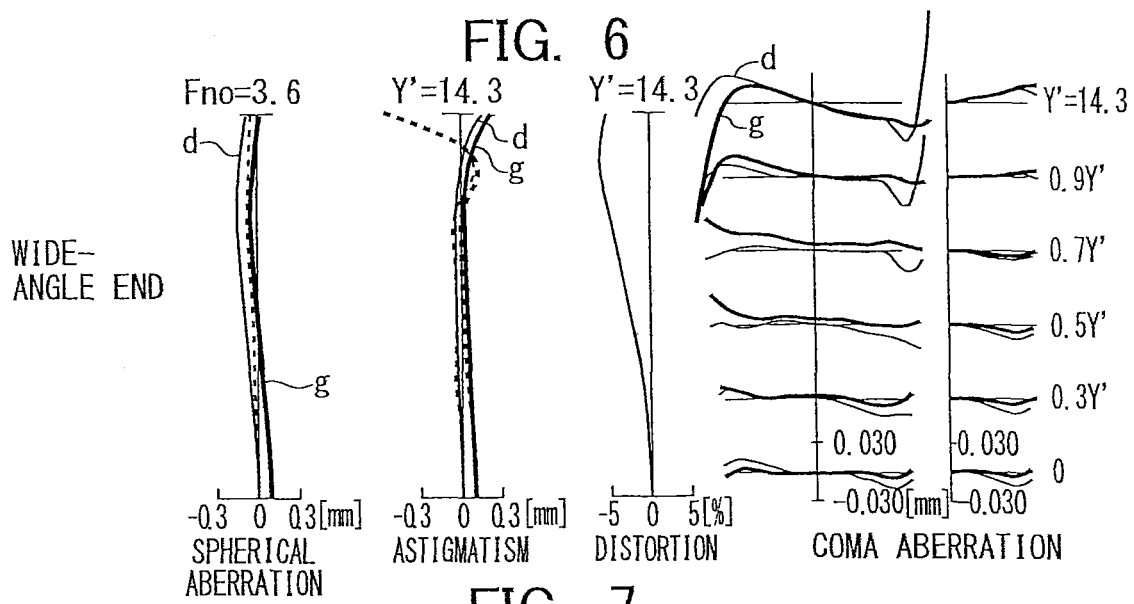
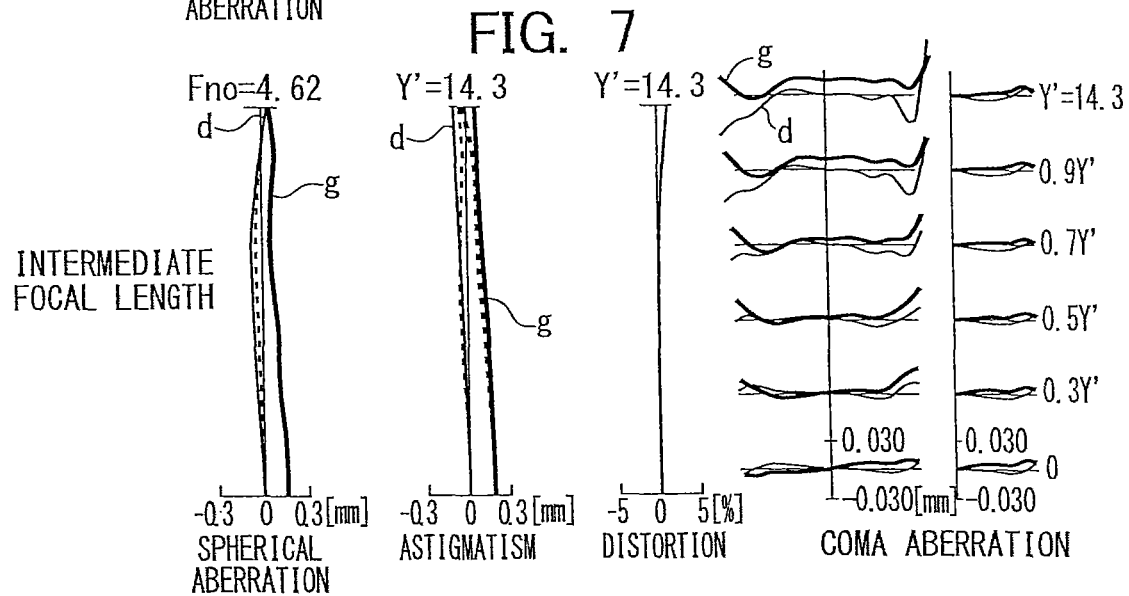
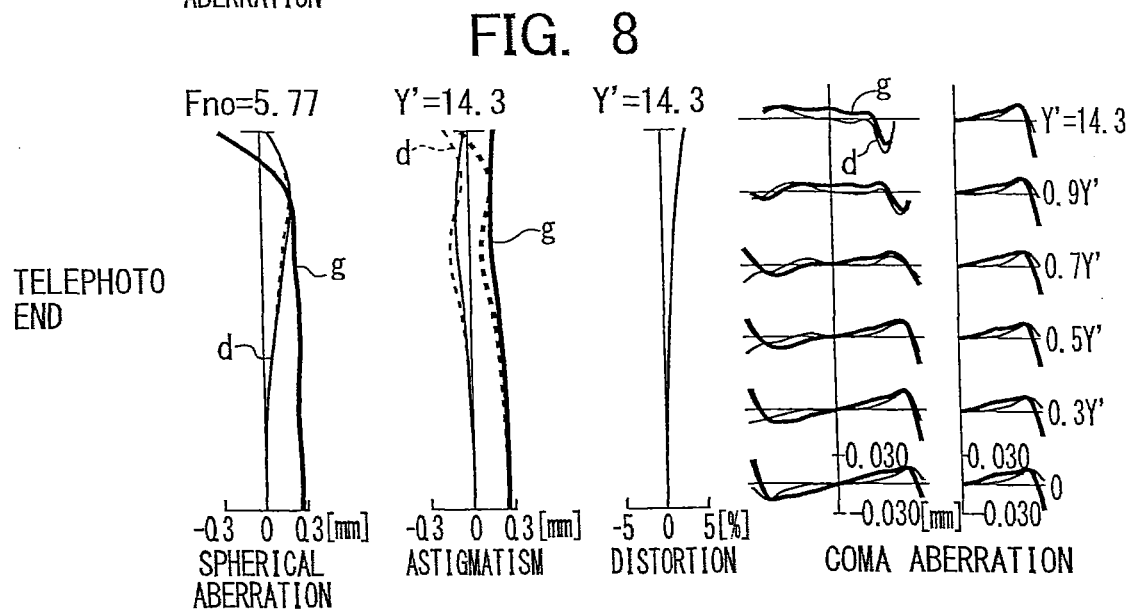

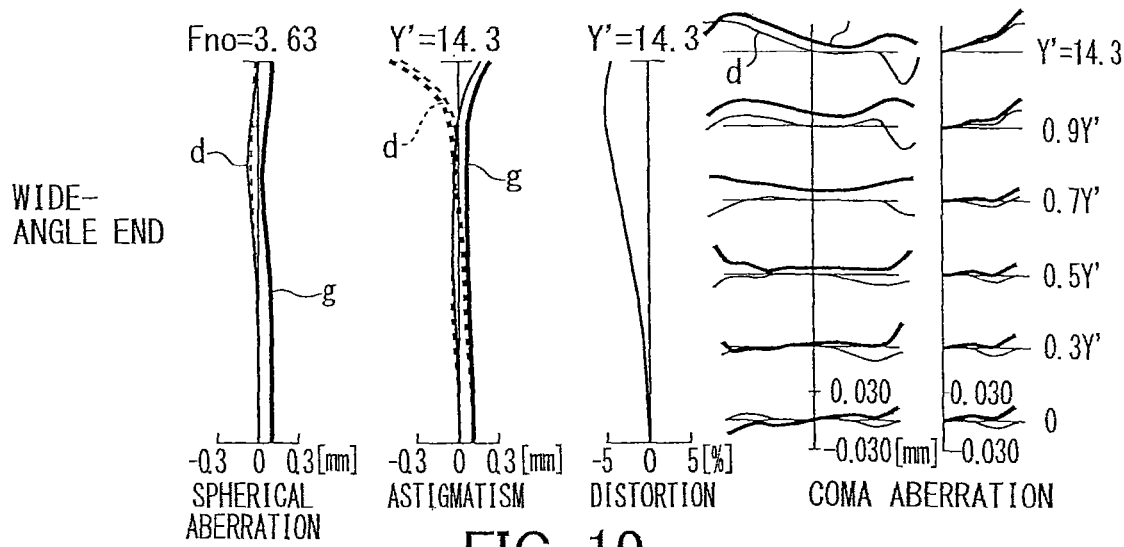
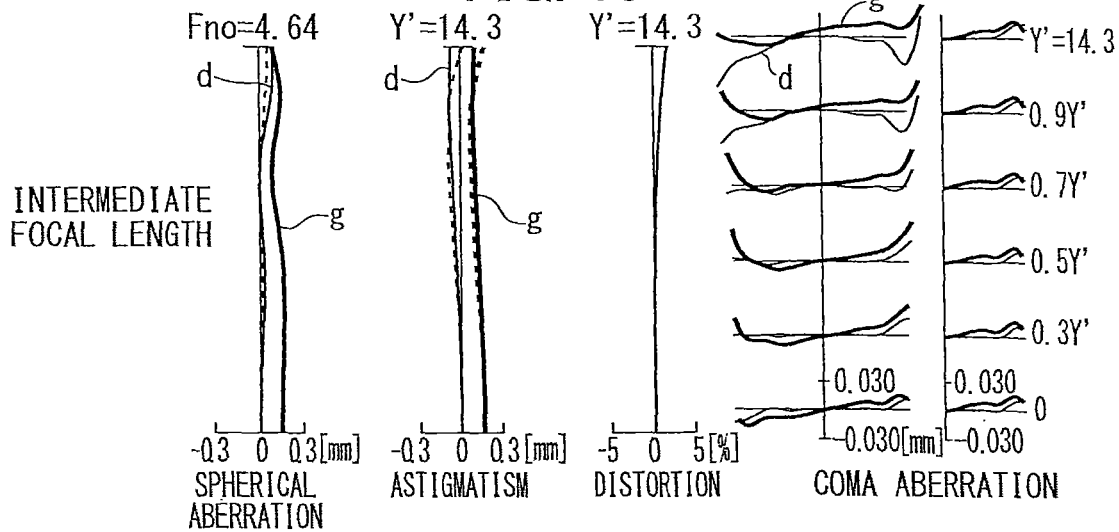
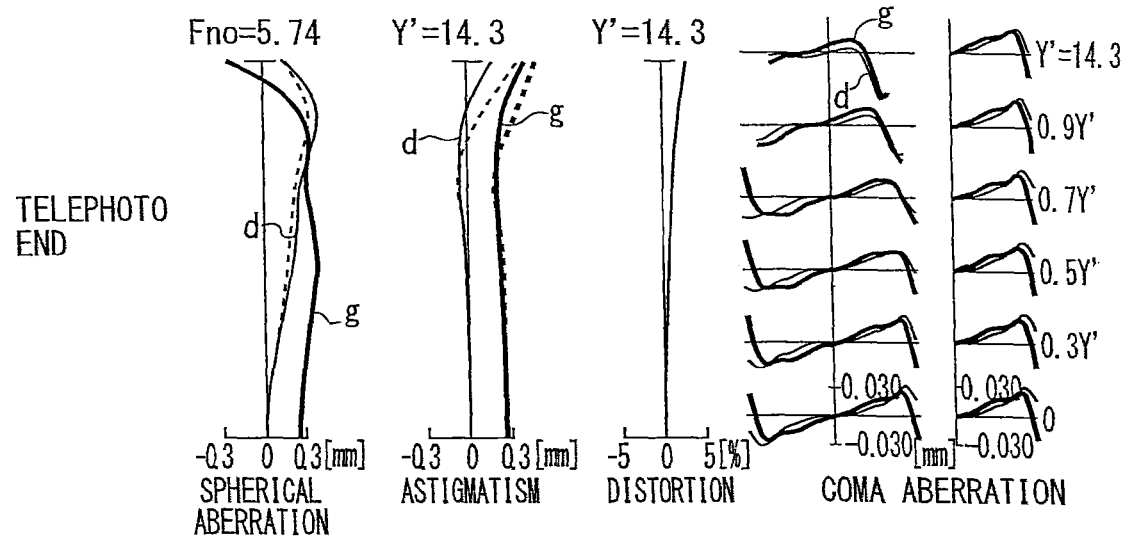

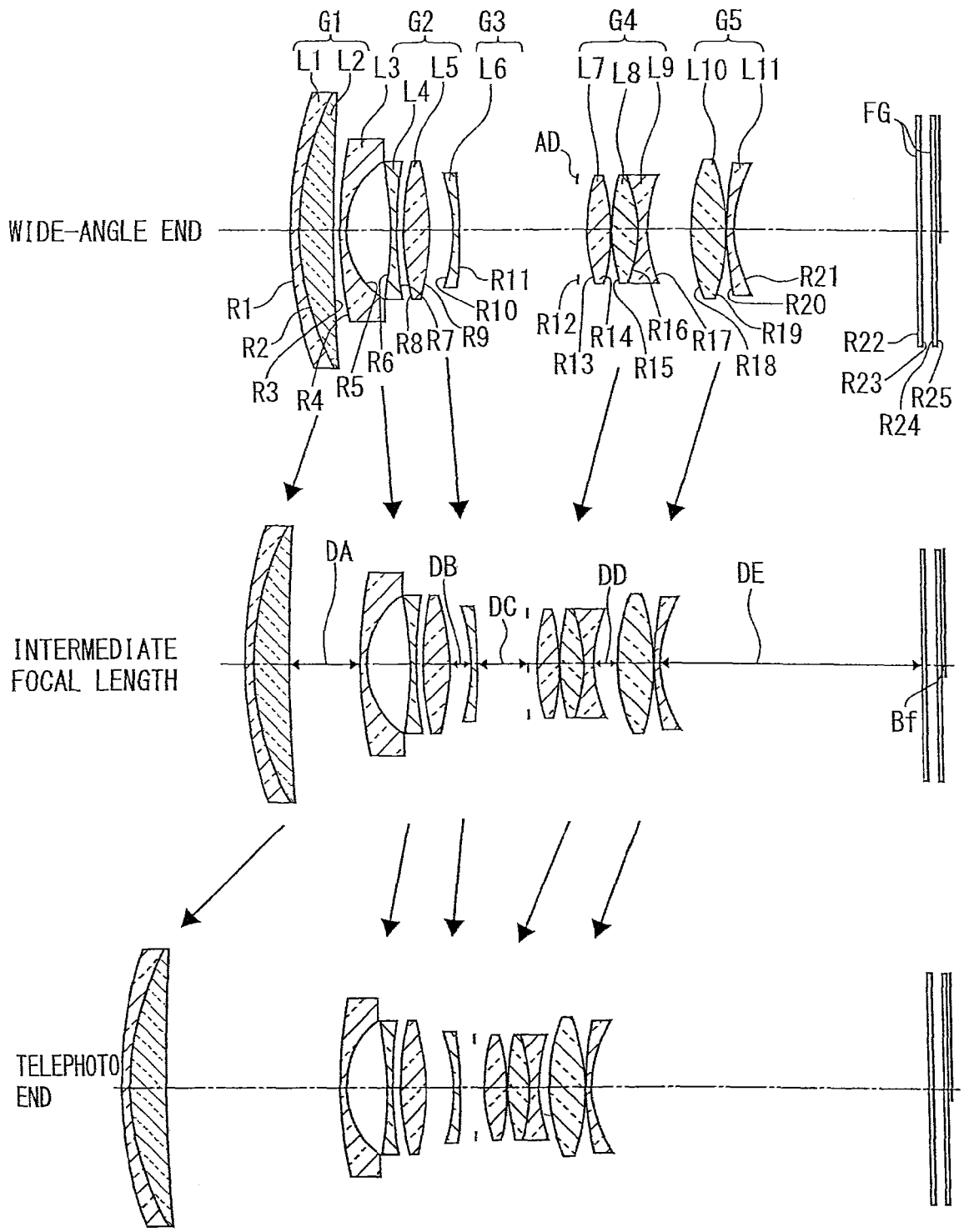

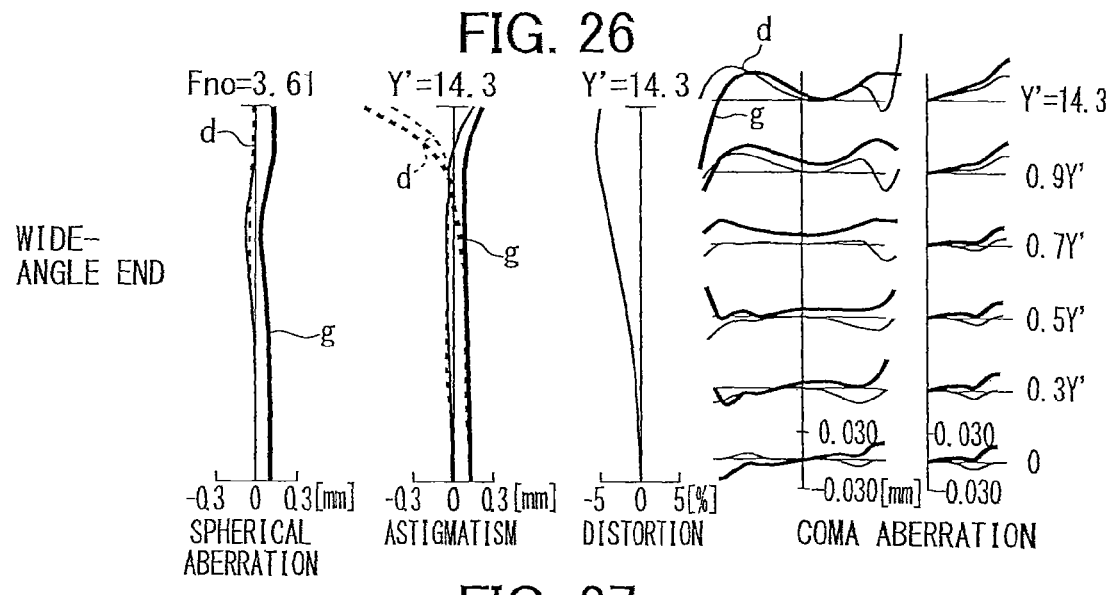
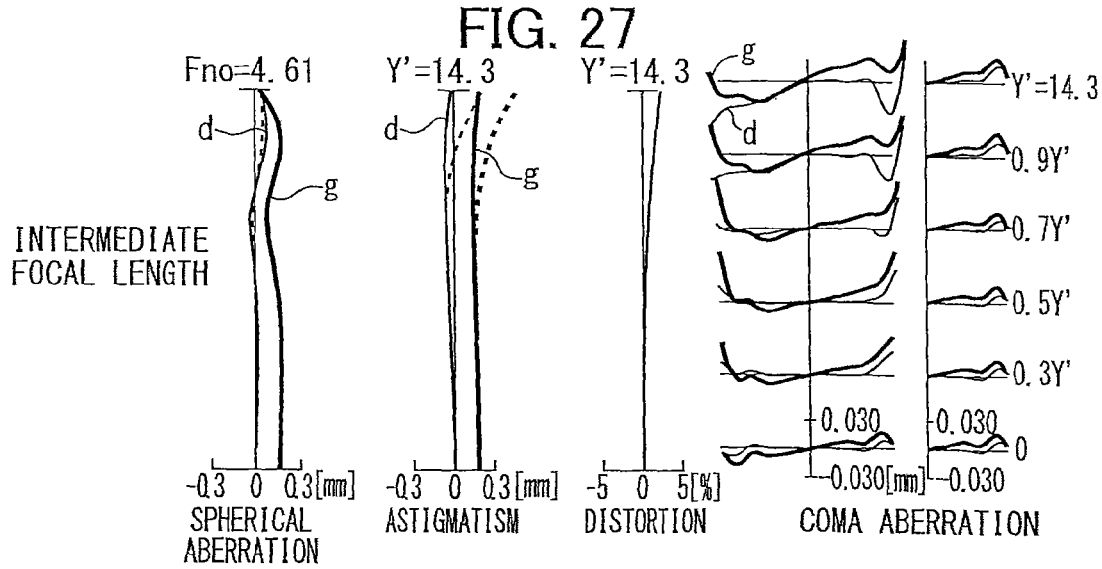
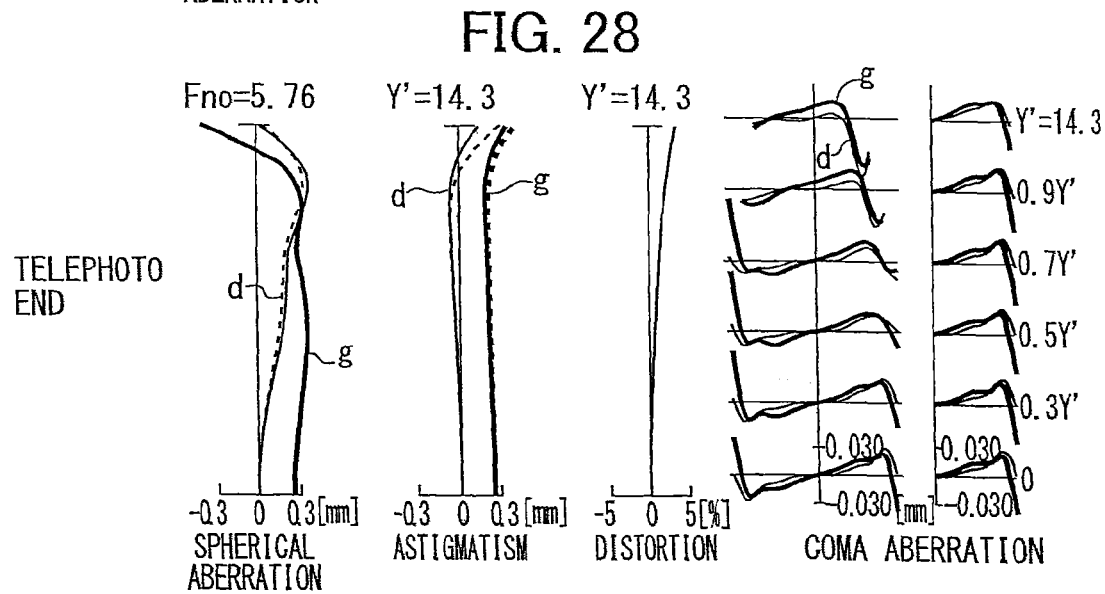

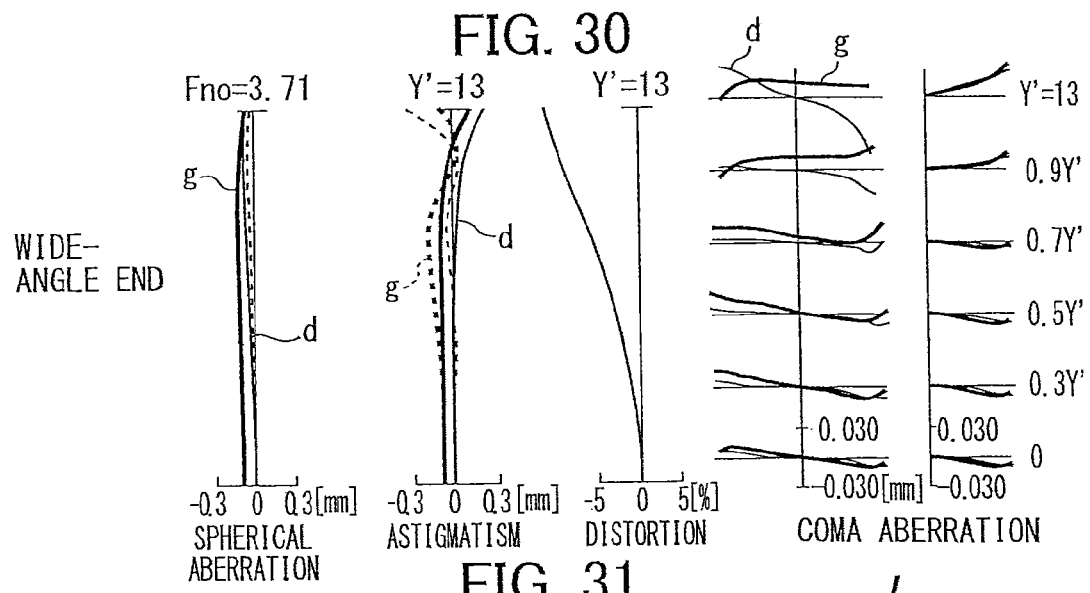
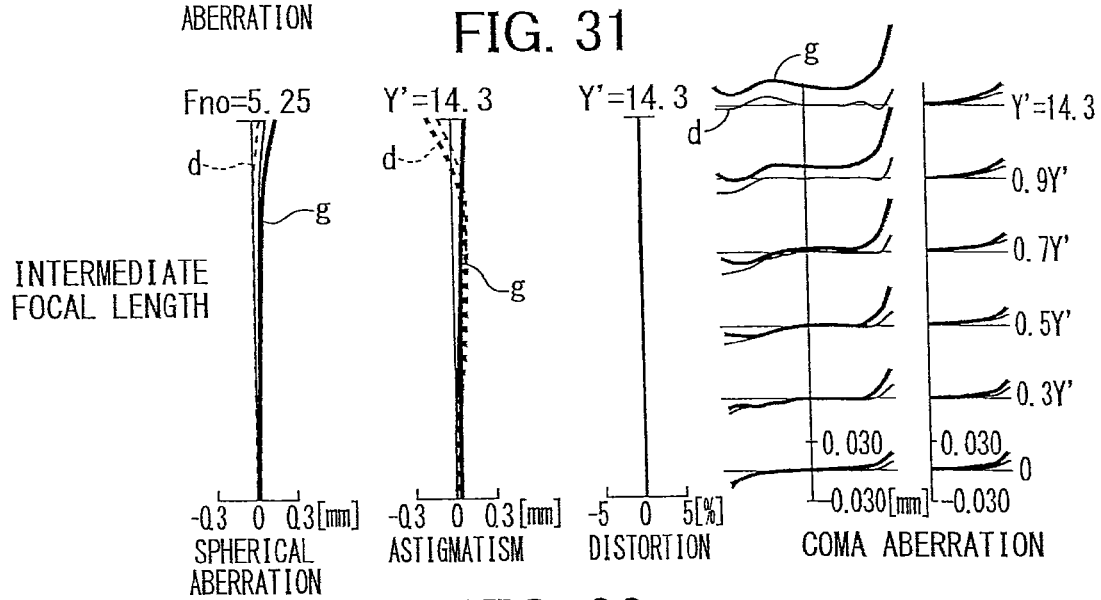
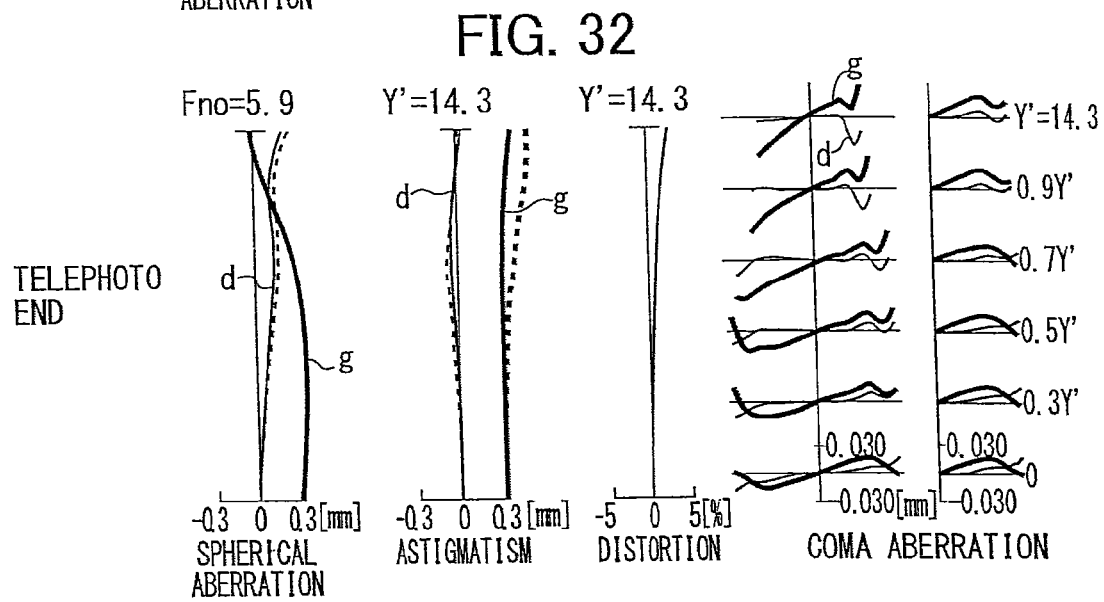

ZOOM LENS, IMAGING DEVICE, AND PORTABLE DIGITAL DEVICE

PRIORITY CLAIM

The present application is based on and claims priority from Japanese Patent Application No. 2012-053886, filed on Mar. 10, 2012, and Japanese Patent Application No. 2012-043599, filed on Feb. 29, 2012, the disclosures of which are hereby incorporated by reference in their entirety.

BACKGROUND

1. Field of the Invention

The present invention relates to a zoom lens having a function which changes an angle of view by changing a focal distance, and a zoom lens suitable for an imaging device which obtains subject image data by using an imaging element. In particular, the present invention relates to a compact zoom lens suitable for a digital camera which images a still image, a video camera which images a moving image or the like, an imaging device and a portable digital device using such a zoom lens as an imaging optical system.

2. Description of the Related Art

In recent years, widespread digital cameras are requested to be further downsized and to offer additional technical advantages. Such digital cameras include an autofocus (autofocus adjustment: hereinafter referred to as AF) function, and the digital cameras including such an AF function are requested to have an increased autofocus speed (hereinafter referred to as AF speed). Zoom lenses often adapted to many digital cameras as a shooting lens are also requested to be downsized and offer additional technical advantages.

In order to downsize the zoom lens, it is necessary to reduce the entire length of the zoom lens (distance from most object side lens surface to image side) when used. It is also necessary to downsize a focusing lens in order to increase an AF speed.

Moreover, it is necessary for the zoom lens to have resolution corresponding to an imaging element having at least 10 million pixels over the entire zoom area in view of the application to a high-end digital camera in order to offer additional technical advantages.

A zoom lens including, in order from an object side, a first lens group having a positive focal length, a second lens group having a negative focal length, a third lens group having a negative focal length, a fourth lens group having a positive focal length, and a fifth lens group having a positive focal length is widely known as a zoom lens suitable for a high zoom ratio. Examples of such a zoom lens including a five-lens group configuration of positive, negative, negative, positive and positive are disclosed in Patent Document 1 (JP3716418B) and Patent Document 2 (JP4401451B), for example.

Patent Document 1 discloses as a specific example a zoom lens having a five-lens group configuration of positive, negative, negative, positive and positive, and performing focusing by moving the third lens group as a focus group. In such a zoom lens, the third lens group is a cemented lens made of two lenses of negative and positive, so the third lens group is likely to be increased in size and weight. Therefore, a load for moving the focus group is increased, so that a motor which drives the focus group is increased in size, and thus, a long time is required for the focusing operation.

Patent Document 2 also discloses as a specific example (for example, Embodiment 4) a zoom lens having a five-lens group configuration of positive, negative, negative, positive and positive, and performing focusing by moving the third lens group as a focus group. In such a zoom lens, the third lens group has three lenses of negative, positive and negative, so the third lens group is likely to be increased in size and weight. Therefore, a load for moving the focus group is increased similar to the case in Patent Document 1, so that a motor which drives the focus group is increased in size, and thus, a long time is also required for the focusing operation.

Namely, although the configurations disclosed in both of Patent Documents 1, 2 are suitable for a high zoom ratio, and are expected to be downsized, to increase an AF speed and to offer additional technical advantages, the focus group is increased in size and weight. For this reason, a load for moving the focus group is increased, so that a motor which drives the focus group is increased in size, and thus, a long time is required for the focusing operation.

SUMMARY

The present invention has been made in view of the above circumstances, and an object of the present invention is to provide a zoom lens which is suitable for a compact and high performance digital camera or the like, is able to increase an AF speed, downsize a driving system required for an AF operation, and achieve resolution corresponding to an imaging element having more than 10 million pixels, and also to provide a compact and high performance imaging device and portable digital device using such a zoom lens as an imaging optical system.

To attain the above object, one embodiment of the present invention provides a zoom lens including, in order from an object side along an optical axis, a first lens group having a positive refractive power, a second lens group having a negative refractive power, a third lens group having a negative refractive power, a fourth lens group having a positive refractive power, and a fifth lens group having a positive refractive power, wherein with a change in a magnification from a wide-angle end to a telephoto end, an interval between the first lens group and the second lens group is increased, the interval between the second lens group and the third lens group is changed, the interval between the third lens group and the fourth lens group is decreased, the interval between the fourth lens group and the fifth lens group is decreased, and focusing is performed by the third lens group, and the following condition (1) is satisfied where a summation of thickness of each of the first to fifth lens groups in the optical axis direction is Dg, a distortion in the wide-angle end in an infinity focusing is Disw, an image height is Y', and an intermediate focal length Fm is Fm=√(Fw×Ft) where a focal length in the wide-angle end is Fw and a focal length in the telephoto end is Ft.

$$3\times10^{-3} < |(Dg \times Disw)/(Y' \times Fm)| < 1\times10^{-2} \qquad (1)$$

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 1 provides sectional views along an optical axis in a wide-angle end, intermediate focal length and telephoto end, schematically illustrating a configuration of an optical system of a zoom lens and a zoom trajectory in Embodiment 1 according to a first embodiment of the present invention.

FIG. 2 provides aberration curves illustrating spherical aberration, astigmatism, distortion and coma aberration in the wide-angle end of the zoom lens according to Embodiment 1 illustrated in FIG. 1.

FIG. 3 provides aberration curves illustrating spherical aberration, astigmatism, distortion and coma aberration in the intermediate focal length of the zoom lens according to Embodiment 1 illustrated in FIG. 1.

FIG. 4 provides aberration curves illustrating spherical aberration, astigmatism, distortion and coma aberration in the telephoto end of the zoom lens according to Embodiment 1 illustrated in FIG. 1.

FIG. 6 provides aberration curves illustrating spherical aberration, astigmatism, distortion and coma aberration in the wide-angle end of the zoom lens according to Embodiment 2 illustrated in FIG. 5.

FIG. 7 provides aberration curves illustrating spherical aberration, astigmatism, distortion and coma aberration in the intermediate focal length of the zoom lens according to Embodiment 2 illustrated in FIG. 5.

FIG. 8 provides aberration curves illustrating spherical aberration, astigmatism, distortion and coma aberration in the telephoto end of the zoom lens according to Embodiment 2 illustrated in FIG. 5.

FIG. 18 provides aberration curves illustrating spherical aberration, astigmatism, distortion and coma aberration in the wide-angle end of the zoom lens according to Embodiment 5 illustrated in FIG. 17.

FIG. 19 provides aberration curves illustrating spherical aberration, astigmatism, distortion and coma aberration in the intermediate focal length of the zoom lens according to Embodiment 5 illustrated in FIG. 17.

FIG. 20 provides aberration curves illustrating spherical aberration, astigmatism, distortion and coma aberration in the telephoto end of the zoom lens according to Embodiment 5 illustrated in FIG. 17.

FIG. 25 provides sectional views along an optical axis in a wide-angle end, intermediate focal length and telephoto end, schematically illustrating a configuration of an optical system of a zoom lens and a zoom trajectory in Embodiment 7 according to a seventh embodiment of the present invention.

FIG. 26 provides aberration curves illustrating spherical aberration, astigmatism, distortion and coma aberration in the wide-angle end of the zoom lens according to Embodiment 7 illustrated in FIG. 25.

FIG. 27 provides aberration curves illustrating spherical aberration, astigmatism, distortion and coma aberration in the intermediate focal length of the zoom lens according to Embodiment 7 illustrated in FIG. 25.

FIG. 28 provides aberration curves illustrating spherical aberration, astigmatism, distortion and coma aberration in the telephoto end of the zoom lens according to Embodiment 7 illustrated in FIG. 25.

FIG. 30 provides aberration curves illustrating spherical aberration, astigmatism, distortion and coma aberration in the wide-angle end of the zoom lens according to Embodiment 8 illustrated in FIG. 29.

FIG. 31 provides aberration curves illustrating spherical aberration, astigmatism, distortion and coma aberration in the intermediate focal length of the zoom lens according to Embodiment 8 illustrated in FIG. 29.

FIG. 32 provides aberration curves illustrating spherical aberration, astigmatism, distortion and coma aberration in the telephoto end of the zoom lens according to Embodiment 8 illustrated in FIG. 29.

DESCRIPTION OF THE PREFERRED EMBODIMENT

Figure 5:
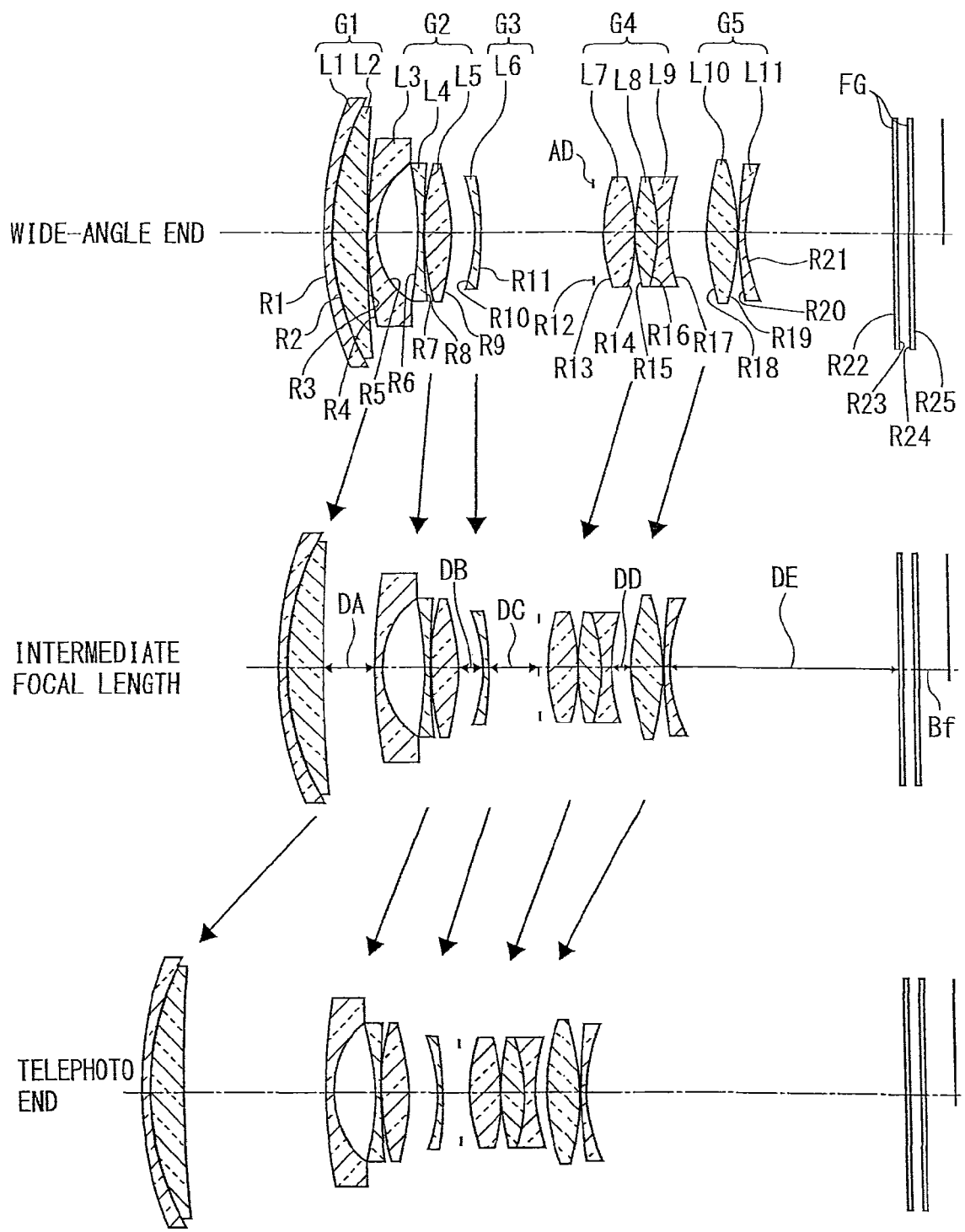
FIG. 5 provides sectional views along an optical axis in a wide-angle end, intermediate focal length and telephoto end, schematically illustrating a configuration of an optical system of a zoom lens and a zoom trajectory in Embodiment 2 according to a second embodiment of the present invention.

Hereinafter, a zoom lens, imaging device and portable digital device according to embodiments of the present invention will be described with reference to the drawings. Before describing specific embodiments, principle embodiments of the present invention will be described.

The first to eighth embodiments of the present invention relate to a zoom lens.

The zoom lens according to the first to eighth embodiments of the present invention includes, in order from an object side along an optical axis, a first lens group having a positive refractive power, a second lens group having a negative refractive power, a third lens group having a negative refractive power, a fourth lens group having a positive refractive power and a fifth lens group having a positive refractive power, and performs focusing by moving the third lens group.

In such a zoom lens, the interval between the first lens group and the second lens group is increased, the interval between the second lens group and the third lens group is changed, the interval between the third lens group and the fourth lens group is decreased, and the interval between the fourth lens group and the fifth lens group is decreased in accordance with a change in a magnification from the wide-angle end (short focal end) to the telephoto end (long focal end).

Such a zoom lens is configured to satisfy the following condition (1).

$$3\times10^{-3} < |(Dg \times Disw)/(Y' \times Fm)| < 1\times10^{-2} \quad [1]$$

In this case, Dg denotes a summation of thickness of each lens group in the optical axis direction, Disw denotes a distortion in the wide-angle end in the infinity focusing, Y' denotes an image height, and the intermediate focal length Fm denotes Fm=√(Fw×Ft) where the focal length in the wide-angle end is Fw and the focal length in the telephoto end is Ft.

When |(Dg×Disw)/(Y'×Fm)| of the condition (1) falls below $3\times10^{-3}$ of the lower limit value, it becomes difficult to correct an aberration such as a distortion or a manufacturing error sensitivity is increased due to unreasonable downsizing, causing a productivity problem. Alternatively, it is possible to downsize a zoom lens while increasing the number of elements constituting each lens group, but the costs are increased due to the increase in the number of elements, or a productivity problem occurs. On the other hand, when |(Dg×Disw)/(Y'×Fm)| of the condition (1) exceeds $1\times10^{-2}$ of the upper limit value, the entire length of the optical system is increased, so that an imaging device such as a camera is increased in size or the distortion is deteriorated to an unacceptable level.

Therefore, by constituting the zoom lens to satisfy the condition (1), the optical entire length and the optical property such as a distortion and the productivity and the costs are well balanced.

In this case, Y' of the condition (1) denotes an image height in the wide-angle end. In recent years, since a certain level of distortion may be corrected by an improved image process, an optical image height may differ between the wide-angle end and the telephoto end in the zoom lens. For this reason, the image height of condition (1) is defined as an image height in the wide-angle end. However, although the distortion is corrected by the image process, the contrast may be decreased if the correction amount is increased. Consequently, it is preferable to optically correct the distortion as much as possible.

It is also preferable to arrange an aperture stop between the third lens group and the fourth lens group in the above zoom lens. By defining the arrangement of the aperture stop as just described, the lens configuration of the above zoom lens can be more effectively operated. In this case, the aperture stop can be moved independently from the third and fourth lens groups so as to avoid the interference with the lens groups, or can be moved together with the third lens group. However, it is preferable for the aperture stop to move together with the fourth lens group.

It is preferable for the fourth lens group and the fifth lens group to include four elements or below in total where a cemented lens is counted as one element and a non-cemented individual lens is counted as one element.

By satisfying the above condition (1), the fourth and fifth lens groups are constituted by 4 elements or below in total, so that the problems regarding costs or productivity can be reduced.

It is preferable for the lens group including the fourth lens group and the fifth lens group to include at least one cemented lens in the above-described zoom lens.

With this configuration, the number of elements can be reduced when the number of lenses is the same. Such a configuration is advantageous not only for managing the components and the number of processes when assembling lens groups to a lens barrel, but also for managing the assembling accuracy compared to the management of the positional accuracy of a lens. Thus, the productivity is improved.

It is preferable to form an aspheric surface in one lens or more constituting each of the fourth and fifth lens groups in the above-described zoom lens.

Forming an aspheric surface in one or more lenses constituting the fourth lens group is effective for correcting an aberration, especially, a spherical aberration, and contributes to the downsizing of the entire length of the optical system and the reducing of the effective diameter of the lens and also the downsizing of an imaging device such as a camera. Therefore, the number of elements of the optical system can be reduced. Moreover, the deterioration in the distortion due to the focusing can be controlled. Forming an aspheric surface in one lens or more constituting the fifth lens group is also effective for correcting an aberration, especially, a field curvature, and contributes to the downsizing of the entire length of the optical system and the reducing of the effective diameter of the lens, and also the downsizing of the imaging device such as a camera. Therefore, the number of elements of the optical system can be reduced.

It is preferable to form an aspheric surface in one lens or more constituting the second lens in the above-described zoom lens.

Such a configuration is effective for correcting a distortion, and can prevent a lens from being increased in size in order to correct the distortion. It can prevent an effective diameter of a lens from being increased, and thus, it can contribute to the downsizing of the lens.

It is preferable for the aspheric surface in the second lens group to be formed in the second lens or the subsequent lens from the object side in one lens or more constituting the second lens group in the above-described zoom lens.

By forming the aspheric surface in the second lens or the subsequent lens from the object side, the effective diameter of the aspheric lens can be reduced compared to a case of forming the aspheric surface in the most object side lens in the second lens group. Therefore, the accuracy of the aspheric surface can be easily ensured, and the costs of the aspheric lens, which tends to be increased compared to a spherical lens, can be reduced.

It is preferable for the first lens group to include two lenses in the above-described zoom lens. By satisfying the requirement of the above-described zoom lens, an aberration is not deteriorated even if the first lens group is constituted by two lenses, so that the zoom lens can be further downsized.

It is preferable for the third lens group to include one negative lens in the above-described zoom lens. By satisfying the requirement of the above-described zoom lens, an aberration due to the focusing is not deteriorated even if the third lens group as a focus group is constituted by one negative lens. Accordingly, the focus group can be downsized or the AF speed can be increased.

It is preferable for the above-described zoom lens to satisfy the following condition (2).

$$2 < Tlt/(Y'(Ft/Fw)) < 3 \quad [2]$$

In this case, Tlt denotes an entire length of an optical system in the telephoto end, Y' denotes an image height, Fw denotes a focal length in the wide-angle end and Ft denotes a focal length in the telephoto end.

When $Tlt/(Y' \cdot (Ft/Fw))$ of the condition (2) falls below 2 of the lower limit value, it becomes difficult to correct an aberration such as a distortion or a manufacturing error sensitivity is increased due to unreasonable downsizing, causing a productivity problem. Alternatively, it is possible to downsize the zoom lens while increasing the number of elements constituting each lens group, but the costs are increased due to the increase in the number of elements or a productivity problem occurs.

On the other hand, when $Tlt/(Y' \cdot (Ft/Fw))$ of the condition (2) exceeds 3 of the upper limit value, the entire length of the optical system is increased, resulting in an increase in the size of the imaging device such as a camera or the distortion is deteriorated to an unacceptable level.

Therefore, by constituting the zoom lens to satisfy the above condition (2), the entire length of the optical system and the optical property such as a distortion and the costs and the productivity can be well balanced.

In this case, Y' (image height) of the condition (2) denotes an image height in the wide-angle end. In recent years, since a certain level of distortion may be corrected by an improved image process, an optical image height may differ between the wide-angle end and the telephoto end in the zoom lens. For this reason, the image height of condition (2) is defined as an image height in the wide-angle end. However, although the distortion is corrected by the image process, the contrast may be decreased if the correction amount is increased. Consequently, it is preferable to optically correct the distortion as much as possible.

With the configuration described above, a compact zoom lens in which aberrations are well corrected, and which is capable of corresponding to a light-receiving element having more than 10 million pixels can be achieved.

The above description is common to the zoom lens according to the first to eighth embodiments.

The ninth embodiment of the present invention relates to an imaging device such as a digital camera.

An imaging device according to the ninth embodiment of the present invention uses the above-described zoom lens as an imaging optical system. With this configuration, a compact and high performance imaging device such as a digital camera can be achieved. By using the zoom lens which satisfies the condition (1), the decrease in the summation Dg of the thickness of each lens group in the optical axis direction and the aberration correction can be well balanced. Therefore, such a zoom lens is suitable for an imaging device in which a lens is collapsed to be housed, and an exchangeable lens for an imaging device.

Next, specific embodiments based on the above embodiments will be described. The following Embodiments 1-8 are specific embodiments based on numerical examples of the zoom lenses according to the first to eighth embodiments of the present invention.

FIGS. 1-4 are views describing a zoom lens in Embodiment 1 according to the first embodiment of the present invention. FIGS. 5-8 are views describing a zoom lens in Embodiment 2 according to the second embodiment of the present invention. FIGS. 9-12 are views describing a zoom lens in Embodiment 3 according to the third embodiment of the present invention. FIGS. 13-16 are views describing a zoom lens in Embodiment 4 according to the fourth embodiment of the present invention. FIGS. 17-20 are views describing a zoom lens in Embodiment 5 according to the fifth embodiment. FIGS. 21-24 are views describing a zoom lens in Embodiment 6 according to the sixth embodiment. FIGS. 25-28 are views describing a zoom lens in Embodiment 7 according to the seventh embodiment. FIGS. 29-32 are views describing a zoom lens in Embodiment 8 according to the eighth embodiment. In the zoom lens in each of Embodiments 1-8, an optical element made of a parallel plate disposed on the image surface side of the fifth lens group is illustrated as an equivalent transparent parallel plate FG; for example, various optical filters such as an optical low-pass filter or an infrared cut filter, or a cover glass (sealing glass) of a light-receiving imaging element such as a CMOS (complementary metal-oxide semiconductor) or CCD (charged-coupled device) image sensor.

In Embodiments 1-8, some lens surfaces are aspheric surfaces. A configuration, which directly forms an aspheric surface in each lens surface as a so-called mold aspheric surface lens, or a configuration, which forms an aspheric surface in a lens surface of a spherical lens to obtain an aspheric surface by providing a resin thin film as a so-called hybrid aspheric surface, can be used for forming an aspheric surface.

The aberration in the zoom lens of each of Embodiments 1-8 is sufficiently corrected, and the zoom lens is able to correspond to a light-receiving element having more than 10 million pixels. It is apparent from each of Embodiments 1-8 that the AF operation speed can be increased and the driving system for the AF operation can be downsized, and very good image performance can be ensured while achieving sufficient downsizing by constituting the zoom lens in accordance with each of Embodiments 1-8.

Embodiment 1

The meanings of reference signs common to Embodiments 1-8 are as follows.
 f: focal length of entire optical system
 F: F-number (F value)
 ω: half-field angle (degree)
 R: curvature radius (paraxial curvature radius for aspheric surface)
 D: surface interval
 Nd: refractive index
 vd: Abbe's number
 K: conical constant of aspheric surface
 A4: $4^{th}$ order aspheric surface coefficient A6: $6^{th}$ order aspheric surface coefficient
A8: $8^{th}$ order aspheric surface coefficient
A10: $10^{th}$ order aspheric surface coefficient
A12: $12^{th}$ order aspheric surface coefficient
Bf: backfocus (distance from last optical surface of optical system to image surface)

An aspheric surface shape is defined by the following Equation (3) where X is an aspheric surface amount in an optical axis direction by using an inverse of a paraxial curvature radius (paraxial curvature), C, a height from an optical axis, H, and a conical constant, K, and an aspheric surface coefficient of each order. The shape is specified by applying a paraxial curvature radius, a conical constant and aspheric surface coefficients.

$$X = \frac{cH^2}{1+\sqrt{\{1-(1+K)c^2H^2\}}} + A_4 \cdot H^4 + A_6 \cdot H^6 + A_8 \cdot H^8 + A_{10} \cdot H^{10} + A_{12} \cdot H^{12} \quad [3]$$

FIG. 1 provides sectional views along an optical axis in a wide-angle end, intermediate focal length and telephoto end, schematically illustrating a configuration of an optical system of a zoom lens and a zoom trajectory in Embodiment 1 according to the first embodiment of the present invention. In addition, in FIG. 1 illustrating the arrangement of lens groups of Embodiment 1, the left side is an object (subject) side.

The zoom lens illustrated in FIG. 1 includes in order from the object side along the optical axis a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and an aperture stop AD disposed between the third and fourth lens groups G3, G4.

The first lens group G1 includes in order from the object side a first lens L1 and second lens L2, the second lens group G2 includes in order from the object side a third lens L3, fourth lens L4, and fifth lens L5, the third lens group G3 includes a single sixth lens L6, the fourth lens group G4 includes in order from the object side a seventh lens L7, eighth lens L8, and ninth lens L9, and the fifth lens group G5 includes in order from the object side a tenth lens L10 and eleventh lens L11.

The first to fifth lens groups G1-G5 are supported by supporting frames or the like which are appropriately common to the respective lens groups. Each lens group integrally moves in zooming. FIG. 1 illustrates surface numbers of the respective optical surfaces.

With a change in a magnification from the wide-angle end (short focus end) to the telephoto end (long focus end), the entire groups of the first to fifth lens groups G1-G5 are moved, so that the interval between the first and second lens groups G1, G2 is increased, the interval between the second and third lens groups G2, G3 is increased, the interval between the third and fourth lens groups G3, G4 is decreased, and the interval between the fourth and fifth lens groups G4, G5 is decreased. The aperture stop AD moves together with the fourth lens group G4.

The first lens group G1 includes in order from the object side the first lens L1 made of a negative meniscus lens having a convex surface on the object side, and the second lens L2 made of a positive meniscus lens having a convex surface on the object side. The first and second lenses L1, L2 are cemented to form a cemented lens.

The second lens group G2 includes in order from the object side the third lens L3 made of a negative meniscus lens having a convex surface on the object side, the fourth lens L4 made of a biconcave lens having in both surfaces thereof an aspheric surface and a concave surface on the image side, which is stronger than that on the object side, and the fifth lens L5 made of a biconvex lens having a convex surface on the object side, which is stronger than that on the image side.

The third lens group G3 includes a single sixth lens L6 made of a negative meniscus lens having a strong concave surface on the object side.

The aperture stop AD is disposed between the third and fourth lens groups G3, G4, and moves together with the fourth lens group G4 as described above.

The fourth lens group G4 includes in order from the object side the seventh lens L7 made of a biconvex lens having in both surfaces thereof an aspheric surface and a convex surface on the object side, which is stronger than that on the image side, the eighth lens L8 made of a biconvex lens having a convex surface on the image side, which is stronger than that on the object side, and the ninth lens L9 made of a biconcave lens having a concave surface on the object side, which is stronger than that on the image side. The eighth and ninth lenses L8, L9 are cemented to form a cemented lens.

The fifth lens group G5 includes in order from the object side the tenth lens L10 made of a biconvex lens having in both surfaces thereof an aspheric surface and a convex surface on the object side, which is slightly stronger than that on the image side, and the eleventh lens L11 made of a negative meniscus lens having a convex surface on the object side.

In Embodiment 1, the focal length f of the entire optical system, F-number F and half-field angle ω change in the ranges of f=16.146-29.487-53.852, F=3.59-4.69-5.93 and ω=42.8-25.7-14.5 by zooming. The optical properties of the respective optical elements in Embodiment 1 are as illustrated in the following Table 1.

TABLE 1

OPTICAL PROPERTY

| SURFACE NUMBER | CURVATURE RADIUS R | SURFACE INTERVAL D | Nd | vd | REMARK | |
|---|---|---|---|---|---|---|
| 1 | 35.22784 | 1.30000 | 1.84666 | 23.7800 | L1 | G1 |
| 2 | 25.43981 | 5.58108 | 1.69680 | 55.5300 | L2 | |
| 3 | 161.95730 | VARIABLE DA | | | | |
| 4 | 66.68463 | 0.97007 | 2.00100 | 29.1300 | L3 | G2 |
| 5 | 10.93000 | 6.31830 | | | | |
| 6* | −29.18377 | 0.80000 | 1.69350 | 53.1800 | L4 | |
| 7* | 26.19043 | 0.09955 | | | | |
| 8 | 25.80601 | 4.24896 | 1.84666 | 23.7800 | L5 | |
| 9 | −27.63060 | VARIABLE DB | | | | |
| 10 | −20.24167 | 0.80000 | 1.60300 | 65.4400 | L6 | G3 |
| 11 | −50.23484 | VARIABLE DC | | | | |
| 12 | APERTURE STOP (∞) | 1.45001 | | | AD | |
| 13* | 15.31467 | 3.43574 | 1.51633 | 64.0600 | L7 | G4 |
| 14* | −38.17926 | 0.10000 | | | | |
| 15 | 21.44923 | 3.93180 | 1.53172 | 48.8400 | L8 | |
| 16 | −17.87906 | 1.45000 | 1.83400 | 37.1600 | L9 | |
| 17 | 19.58694 | VARIABLE DD | | | | |
| 18* | 19.29863 | 4.94809 | 1.58913 | 61.1500 | L10 | G5 |
| 19* | −19.58674 | 0.23493 | | | | |
| 20 | 48.01352 | 0.80173 | 1.90366 | 31.3200 | L11 | |
| 21 | 16.49362 | VARIABLE DE | | | | |
| 22 | ∞ | 0.70000 | 1.53770 | 66.6000 | FG | |

TABLE 1-continued

OPTICAL PROPERTY

| SUR-FACE NUMBER | CURVATURE RADIUS R | SURFACE INTERVAL D | Nd | vd | REMARK |
|---|---|---|---|---|---|
| 23 | ∞ | 1.50000 | | | |
| 24 | ∞ | 0.70000 | 1.50000 | 64.0000 | |
| 25 | ∞ | Bf | | | |

In Table 1, the lens surface having the surface number with * is an aspheric surface. This is the same as in the other embodiments.

Namely, in Table 1, each optical surface of the sixth, seventh, thirteenth, fourteenth, eighteenth, and nineteenth surfaces with * is an aspheric surface, and a parameter (aspheric surface coefficient) of each aspheric surface in Equation (3) is as follows. In addition, in the aspheric surface parameter, "En" denotes "power of 10", namely, "×10ⁿ", for example, "E-05" denotes "×10⁻⁵". This is the same as in the other embodiments.

Aspheric Surface Parameter
Sixth Surface
K=0
$A_4$=−1.12571E-05
$A_6$=1.21899E07
$A_8$=2.76874E-09
$A_{10}$=−4.5160E-11
$A_{12}$=1.38009E-13
Seventh Surface
K=0
$A_4$=−4.98762E-05
$A_6$=3.02710E-07
$A_8$=−1.83352E-09
$A_{10}$=−4.9553E-12
Thirteenth Surface
K=0
$A_4$=−2.23034E-05
$A_8$=−3.30061E-08
$A_8$=1.96596E-09
$A_{10}$=−4.33079E-11
Fourteenth Surface
K=0
$A_4$=−6.86789E-06
$A_6$=1.59127E-07
$A_8$=−8.05125E-10
$A_{10}$=−2.46291E-11
Eighteenth Surface
K=−4.76959
$A_4$=−2.06414E-06
$A_6$=−1.71695E-07
$A_8$=−2.33143E-09
$A_{10}$=6.08643E-12
Nineteenth Surface
K=0.25043
$A_4$=3.72591E-05
$A_6$=−4.11291 E-08
$A_8$=−2.02648E-09
$A_{10}$=3.86766E-12

In Embodiment 1, the focal length f of the entire optical system, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and the filter FG, and the interval such as backfocus between the filter FG and the image surface are changed as shown in the following Table 2 along with zooming.

TABLE 2

Variable Interval

| | WIDE-ANGLE END | INTERMEDIATE FOCAL LENGTH | TELEPHOTO END |
|---|---|---|---|
| FOCAL LENGTH f | 16.146 | 29.487 | 53.852 |
| VARIABLE DA | 0.43999 | 6.06511 | 16.38637 |
| VARIABLE DB | 2.90306 | 3.44128 | 4.32097 |
| VARIABLE DC | 17.67216 | 7.91475 | 2.59996 |
| VARIABLE DD | 5.29575 | 2.75180 | 1.65000 |
| VARIABLE DE | 24.97241 | 38.15249 | 51.96423 |
| Bf | 3.05635 | 3.05579 | 3.05479 |

In this case, the values related to the conditions (1), (2) are as follows.
Dg=35.02
Disw=−4.2[%]
Y'=14.3
Fw=16.146
Ft=53.852
Fm: √ (Fw×Ft)=29.487
Tlt=119.35

$|(Dg \times Disw)/(Y' \times Fm)|=0.0035$   CONDITION [1]:

$Tlt/(Y' \cdot (Ft/Fw))=2.5$   CONDITION [2]:

Here, the value of distortion Disw denotes a distortion in the maximum image height. This is the same as in the other embodiments.

FIGS. 2, 3, 4 are aberration views illustrating a spherical aberration, astigmatism, distortion and coma aberration in the wide-angle end, intermediate focal length and telephoto end in Embodiment 1, respectively. In the respective aberration views, the dashed line in the spherical aberration illustrates a sine condition, the solid line and the dashed line in the astigmatism illustrate sagittal and meridional, respectively. In addition, g and d illustrate g-line and d-line, respectively. These are the same as in the other embodiments.

Embodiment 2

FIG. 5 provides sectional views along an optical axis in a wide-angle end, intermediate focal length and telephoto end, schematically illustrating a configuration of an optical system of a zoom lens and a zoom trajectory in Embodiment 2 according to the second embodiment of the present invention. In addition, in FIG. 5 illustrating the arrangement of lens groups of Embodiment 2, the left side is an object (subject) side.

The zoom lens illustrated in FIG. 5 includes in order from the object side along the optical axis a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and an aperture stop AD disposed between the third and fourth lens groups G3, G4.

The first lens group G1 includes in order from the object side a first lens L1 and second lens L2, the second lens group G2 includes in order from the object side a third lens L3, fourth lens L4, and fifth lens L5, the third lens group G3 includes a single sixth lens L6, the fourth lens group G4 includes in order from the object side a seventh lens L7, eighth lens L8, and ninth lens L9, and the fifth lens group G5 includes in order from the object side a tenth lens L10 and eleventh lens L11.

The first to fifth lens groups G1-G5 are supported by supporting frames or the like which are appropriately common to the respective groups. Each lens group integrally moves in zooming. FIG. 5 illustrates surface numbers of the respective optical surfaces. In addition, the respective reference numbers in FIG. 5 are independently used for each embodiment in order to avoid a complicated description due to an increase in the number of reference numbers. Therefore, the configurations are not always the same as those in the other embodiments even if the reference numbers which are common to those in the other embodiments are used.

With a change in a magnification from the wide-angle end (short focus end) to the telephoto end (long focus end), the entire groups of the first to fifth lens groups G1-G5 are moved, so that the interval between the first and second lens groups G1, G2 is increased, the interval between the second and third lens groups G2, G3 is increased, the interval between the third and fourth lens groups G3, G4 is decreased, and the interval between the fourth and fifth lens groups G4, G5 is decreased. The aperture stop AD moves together with the fourth lens group G4.

The first lens group G1 includes in order from the object side the first lens L1 made of a negative meniscus lens having a convex surface on the object side, and the second lens L2 made of a positive meniscus lens having a convex surface on the object side. The first and second lenses L1, L2 are cemented to form a cemented lens.

The second lens group G2 includes in order from the object side the third lens L3 made of a negative meniscus lens having a convex surface on the object side, the fourth lens L4 made of a biconcave lens having in both surfaces thereof an aspheric surface and a concave surface on the image side, which is stronger than that on the object side, and the fifth lens L5 made of a biconvex lens having a convex surface on the image side, which is stronger than that on the object side.

The third lens group G3 includes a single sixth lens L6 made of a negative meniscus lens having a concave surface on the object side.

The aperture stop AD is disposed between the third and fourth lens groups G3, G4, and moves together with the fourth lens group G4 as described above.

The fourth lens group G4 includes in order from the object side the seventh lens L7 made of a biconvex lens having in both surfaces thereof an aspheric surface and a convex surface on the object side, which is stronger than that on the image side, the eighth lens L8 made of a biconvex lens having a convex surface on the image side, which is stronger than that on the object side, and the ninth lens L9 made of a biconcave lens having a concave surface on the object side, which is stronger than that on the image side. The eighth and ninth lenses L8, L9 are cemented to form a cemented lens.

The fifth lens group G5 includes in order from the object side the tenth lens L10 made of a biconvex lens having in both surfaces thereof an aspheric surface and a convex surface on the object side, which is stronger than that on the image side, and the eleventh lens L11 made of a negative meniscus lens having a convex surface on the object side.

In Embodiment 2, the focal length f of the entire optical system, F-number F and half-field angle ω change in the ranges of f=16.146-29.486-53.851, F=3.6-4.62-5.77 and ω=42.9-25.6-14.5 by zooming. The optical properties of the respective optical elements in Embodiment 2 are as illustrated in the following Table 3.

TABLE 3

OPTICAL PROPERTY

| SURFACE NUMBER | CURVATURE RADIUS R | SURFACE INTERVAL D | Nd | vd | REMARK | |
|---|---|---|---|---|---|---|
| 1 | 43.11718 | 1.29999 | 1.84666 | 23.78 | L1 | G1 |
| 2 | 31.73933 | 5.57706 | 1.69680 | 55.53 | L2 | |
| 3 | 190.09719 | VARIABLE DA | | | | |
| 4 | 55.24695 | 0.97008 | 2.00100 | 29.13 | L3 | G2 |
| 5* | 10.53158 | 7.00758 | | | | |
| 6* | −37.69153 | 0.80000 | 1.69350 | 53.18 | L4 | |
| 7* | 39.79764 | 0.12000 | | | | |
| 8 | 35.75261 | 4.22772 | 1.84666 | 23.78 | L5 | |
| 9 | −27.02142 | VARIABLE DB | | | | |
| 10 | −22.16816 | 0.80000 | 1.60300 | 65.44 | L6 | G3 |
| 11 | −68.86241 | VARIABLE DC | | | | |
| 12 | APERTURE STOP (∞) | 1.45020 | | | AD | |
| 13* | 17.70983 | 4.99510 | 1.51633 | 64.06 | L7 | G4 |
| 14* | −25.76032 | 0.10000 | | | | |
| 15 | 24.82196 | 3.73181 | 1.53172 | 48.84 | L8 | |
| 16 | −18.83887 | 1.44999 | 1.83400 | 37.16 | L9 | |
| 17 | 19.93203 | VARIABLE DD | | | | |
| 18* | 18.95445 | 5.30000 | 1.58913 | 61.15 | L10 | G5 |
| 19* | −22.79198 | 0.10000 | | | | |
| 20 | 46.10650 | 0.80000 | 1.90366 | 31.32 | L11 | |
| 21 | 16.80062 | VARIABLE DE | | | | |
| 22 | ∞ | 0.70000 | 1.53770 | 66.60 | FG | |
| 23 | ∞ | 1.50000 | | | | |
| 24 | ∞ | 0.70000 | 1.50000 | 64.00 | | |
| 25 | ∞ | Bf | | | | |

In Table 3, the lens surface having the surface number with * is an aspheric surface. This is the same as in the other embodiments.

Namely, in Table 3, each optical surface of the sixth, seventh, thirteenth, fourteenth, eighteenth, and nineteenth surfaces with * is an aspheric surface, and a parameter (aspheric surface coefficient) of each aspheric surface in Equation (3) is as follows. In addition, in the aspheric surface parameter, "En" denotes "power of 10", namely, "×10$^n$", for example, "E-05" denotes "×10$^{-5}$". This is the same as in the other embodiments.

Aspheric Surface Parameter
Sixth Surface
$K=0$
$A_4=-6.13912E-05$
$A_6=6.02764E-07$
$A_8=-3.68927E-09$
$A_{10}=-5.86282E-12$
Seventh Surface
$K=0$
$A_4=-9.55771E-05$
$A_6=6.67024E-07$
$A_8=-5.78157E-09$
$A_{10}=3.44512E-12$
Thirteenth Surface
$K=0$
$A_4=-2.21195E-05$
$A_6=-1.07672E-06$
$A_8=1.98544E-08$
$A_{10}=-3.47093E-10$
Fourteenth Surface
$K=0$
$A_4=5.12674E-06$
$A_6=-9.94310E-07$
$A_8=1.53589E-08$
$A_{10}=-2.78900E-10$ Eighteenth Surface
K=−1.2879
$A_4$=−1.57778E-05
$A_6$=−7.80973E-08
$A_8$=−8.69905E-10
$A_{10}$=3.89552E-12
Nineteenth Surface
K=0.98584
$A_4$=4.43195E-05
$A_6$=5.66872E-08
$A_8$=−2.64609E-09
$A_{10}$=1.33387E-11

In Embodiment 2, the focal length f of the entire optical system, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and the filter FG, and the interval such as backfocus between the filter FG and the image surface are changed as shown in the following Table 4 along with zooming.

TABLE 4

Variable Interval

|  | WIDE-ANGLE END | INTERMEDIATE FOCAL LENGTH | TELEPHOTO END |
| --- | --- | --- | --- |
| FOCAL LENGTH f | 16.146 | 29.486 | 53.851 |
| VARIABLE DA | 0.44012 | 8.55784 | 22.14102 |
| VARIABLE DB | 3.74070 | 3.93725 | 4.34529 |
| VARIABLE DC | 18.45697 | 8.08099 | 2.59987 |
| VARIABLE DD | 5.92655 | 3.05743 | 1.65001 |
| VARIABLE DE | 23.75626 | 36.70527 | 49.99053 |
| Bf | 5.04359 | 5.04306 | 5.04213 |

In this case, the values related to the conditions (1), (2) are as follows.
Dg=37.29
Disw=−4.58[%]
Y'=14.3
Fw=16.146
Ft=53.851
Fm: $\sqrt{(Fw \times Ft)}$ 29.486
Tlt=127.4

$|(Dg \times Disw)/(Y' \times Fm)|=0.0041$   CONDITION [1]:

$Tlt/(Y' \cdot (Ft/Fw))=2.67$   CONDITION [2]:

FIGS. 6, 7, 8 are aberration views illustrating a spherical aberration, astigmatism, distortion and coma aberration in the wide-angle end, intermediate focal length and telephoto end, respectively in Embodiment 2. In the respective aberration views, the dashed line in the spherical aberration illustrates a sine condition, the solid line and the dashed line in the astigmatism illustrate sagittal and meridional, respectively. In addition, g and d illustrate g-line and d-line, respectively. These are the same as in the other embodiments.

Embodiment 3

Figure 9:
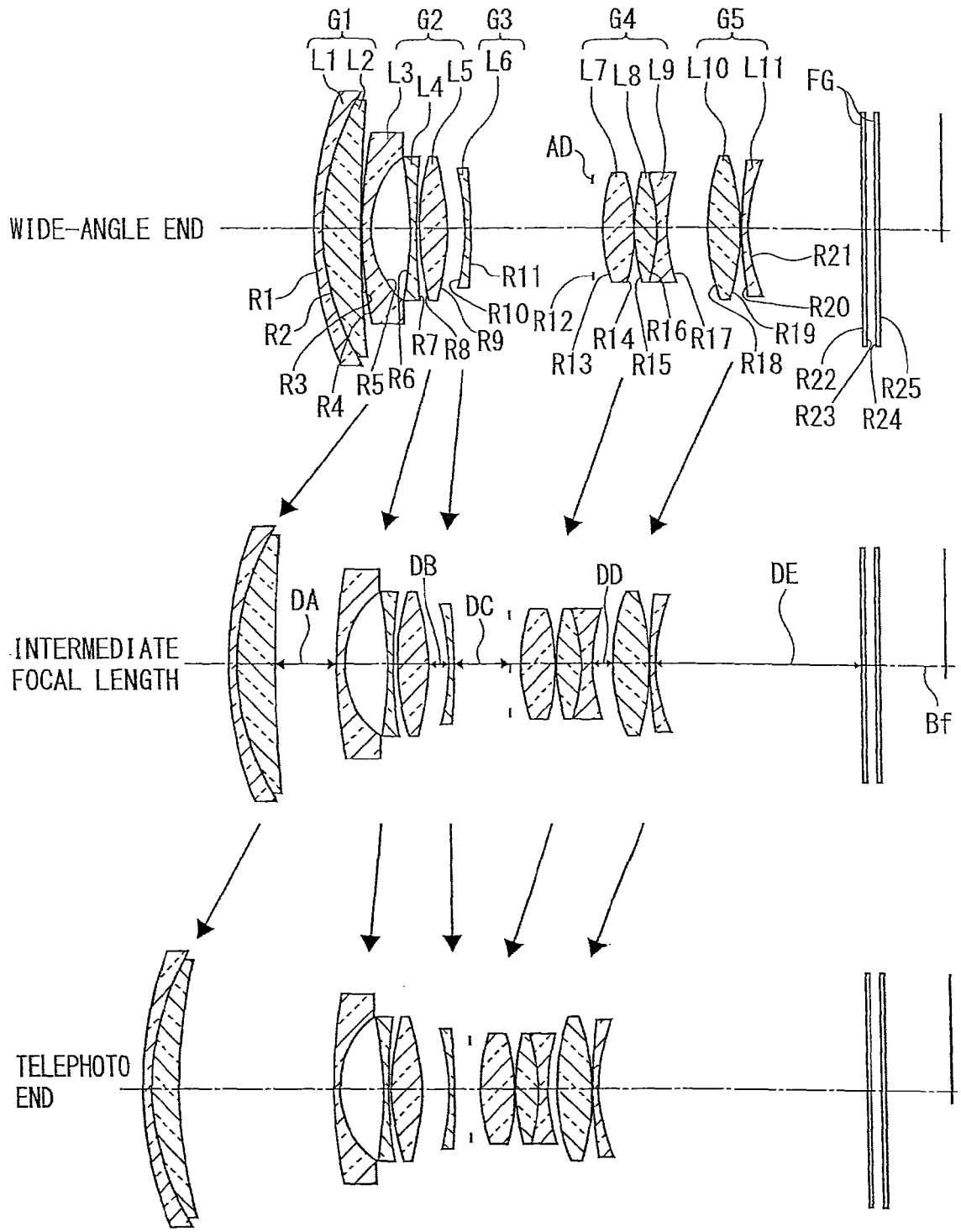
FIG. 9 provides sectional views along an optical axis in a wide-angle end, intermediate focal length and telephoto end, schematically illustrating a configuration of an optical system of a zoom lens and a zoom trajectory in Embodiment 3 according to a third embodiment of the present invention.

FIG. 9 provides sectional views along an optical axis in a wide-angle end, intermediate focal length and telephoto end, schematically illustrating a configuration of an optical system of a zoom lens and a zoom trajectory in Embodiment 3 according to the third embodiment of the present invention. In addition, in FIG. 9 illustrating the arrangement of lens groups of Embodiment 3, the left side is an object (subject) side.

The zoom lens illustrated in FIG. 9 includes in order from the object side along the optical axis a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and an aperture stop AD disposed between the third and fourth lens groups G3, G4.

The first lens group G1 includes in order from the object side a first lens L1 and second lens L2, the second lens group G2 includes in order from the object side a third lens L3, fourth lens L4, and fifth lens L5, the third lens group G3 includes a single sixth lens L6, the fourth lens group G4 includes in order from the object side a seventh lens L7, eighth lens L8, and ninth lens L9, and the fifth lens group G5 includes in order from the object side a tenth lens L10 and eleventh lens L11.

The first to fifth lens groups G1-G5 are supported by supporting frames or the like which are appropriately common to the respective lens groups. Each lens group integrally moves in zooming. FIG. 9 illustrates surface numbers of the respective optical surfaces. In addition, the respective reference numbers in FIG. 9 are independently used for each embodiment in order to avoid a complicated description due to an increase in the number of reference numbers. Therefore, the configurations are not always the same as those in the other embodiments even if the reference numbers which are common to those in the other embodiments are used.

With a change in a magnification from the wide-angle end (short focus end) to the telephoto end (long focus end), the entire groups of the first to fifth lens groups G1-G5 are moved, so that the interval between the first and second lens groups G1, G2 is increased, the interval between the second and third lens groups G2, G3 is increased, the interval between the third and fourth lens groups G3, G4 is decreased, and the interval between the fourth and fifth lens groups G4, G5 is decreased. The aperture stop AD moves together with the fourth lens group G4.

The first lens group G1 includes in order from the object side the first lens L1 made of a negative meniscus lens having a convex surface on the object side, and the second lens L2 made of a positive meniscus lens having a convex surface on the object side. The first and second lenses L1, L2 are cemented to form a cemented lens.

The second lens group G2 includes in order from the object side the third lens L3 made of a negative meniscus lens having a convex surface on the object side, the fourth lens L4 made of a biconcave lens having in both surfaces thereof an aspheric surface and a concave surface on the image side, which is stronger than that on the object side, and the fifth lens L5 made of a biconvex lens having a convex surface on the image side, which is stronger than that on the object side.

The third lens group G3 includes a single sixth lens L6 made of a negative meniscus lens having a concave surface on the object side.

The aperture stop AD is disposed between the third and fourth lens groups G3, G4, and moves together with the fourth lens group G4 as described above.

The fourth lens group G4 includes in order from the object side the seventh lens L7 made of a biconvex lens having in both surfaces thereof an aspheric surface and a convex surface on the object side, which is stronger than that on the image side, the eighth lens L8 made of a biconvex lens having a convex surface on the image side, which is stronger than that on the object side, and the ninth lens L9 made of a biconcave lens having a concave surface on the image side, which is stronger than that on the object side. The eighth and ninth lenses L8, L9 are cemented to form a cemented lens.

The fifth lens group G5 includes in order from the object side the tenth lens L10 made of a biconvex lens having in both surfaces thereof an aspheric surface and a convex surface on the object side, which is stronger than that on the image side, and the eleventh lens L11 made of a negative meniscus lens having a convex surface on the object side.

In Embodiment 3, the focal length f of the entire optical system, F-number F and half-field angle ωchange in the ranges of f=16.146-29.487-53.85, F=3.62-4.59-5.67 and ω=42.8-25.6-14.5 by zooming. The optical properties of the respective optical elements in Embodiment 3 are as illustrated in the following Table 5.

TABLE 5

OPTICAL PROPERTY

| SURFACE NUMBER | CURVATURE RADIUS R | SURFACE INTERVAL D | Nd | vd | REMARK | |
|---|---|---|---|---|---|---|
| 1 | 44.83622 | 1.30000 | 1.84666 | 23.78 | L1 | G1 |
| 2 | 30.32788 | 5.80250 | 1.77250 | 49.60 | L2 | |
| 3 | 152.20233 | VARIABLE DA | | | | |
| 4 | 55.56877 | 0.97009 | 2.00100 | 29.13 | L3 | G2 |
| 5 | 10.85110 | 6.67902 | | | | |
| 6* | −40.92454 | 0.80000 | 1.77030 | 47.4 | L4 | |
| 7* | 36.32245 | 0.65885 | | | | |
| 8 | 30.89732 | 4.44422 | 1.84666 | 23.78 | L5 | |
| 9 | −26.99833 | VARIABLE DB | | | | |
| 10 | −24.45877 | 0.80000 | 1.64850 | 53.02 | L6 | G3 |
| 11 | −103.58339 | VARIABLE DC | | | | |
| 12 | APERTURE STOP (∞) | 1.45008 | | | AD | |
| 13* | 16.52481 | 5.35383 | 1.51633 | 64.06 | L7 | G4 |
| 14* | −25.99633 | 0.10000 | | | | |
| 15 | 23.78029 | 3.61747 | 1.51742 | 52.43 | L8 | |
| 16 | −22.01894 | 1.45000 | 1.83400 | 37.16 | L9 | |
| 17 | 17.55937 | VARIABLE DD | | | | |
| 18* | 19.88520 | 5.30000 | 1.58913 | 61.15 | L10 | G5 |
| 19* | −22.74438 | 0.10000 | | | | |
| 20 | 53.58387 | 0.80000 | 1.90366 | 31.32 | L11 | |
| 21 | 18.67841 | VARIABLE DE | | | | |
| 22 | ∞ | 0.70000 | 1.53770 | 66.60 | FG | |
| 23 | ∞ | 1.50000 | | | | |
| 24 | ∞ | 0.70000 | 1.50000 | 64.00 | | |
| 25 | ∞ | Bf | | | | |

In Table 5, the lens surface having the surface number with * is an aspheric surface. This is the same as in the other embodiments.

Namely, in Table 5, each optical surface of the sixth, seventh, thirteenth, fourteenth, eighteenth, and nineteenth surfaces with * is an aspheric surface, and a parameter (aspheric surface coefficient) of each aspheric surface in Equation (3) is as follows. In addition, in the aspheric surface parameter, "En" denotes "power of 10", namely, "×10$^n$", for example, "E-05" denotes "×10$^{-5}$". This is the same as in the other embodiments.

Aspheric Surface Parameter
Sixth Surface
K=0
$A_4$=−8.18151E-06
$A_6$=−2.01833E-07
$A_8$=2.53333E-09
$A_{10}$=−1.29107E-11
Seventh Surface
K=0
$A_4$=−3.23283E-05
$A_6$=−1.88341 E-07
$A_8$=1.96755E-09
$A_{10}$=−1.43273E-11
Thirteenth Surface
K=0
$A_4$=−3.22004E-05
$A_6$=−9.60992E-07
$A_8$=1.55589E-08
$A_{10}$=−2.82657E-10
Fourteenth Surface
K=0
$A_4$=3.53815E-06
$A_6$=−8.66214E-07
$A_8$=1.17377E-08
$A_{10}$=−2.24402E-10
Eighteenth Surface
K=−1.27337
$A_4$=−1.58768E-05
$A_6$=−1.86624E-07
$A_8$=6.94712E-10
$A_{10}$=−5.97184E-12
Nineteenth Surface
K=0
$A_4$=3.31640E-05
$A_6$=−1.06067E-07
$A_8$=−6.29723E-10
$A_{10}$=0

In Embodiment 3, the focal length f of the entire optical system, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and the filter FG, and the interval such as backfocus between the filter FG and the image surface are changed as shown in the following Table 6 along with zooming.

TABLE 6

| | Variable Interval | | |
|---|---|---|---|
| | WIDE-ANGLE END | INTERMEDIATE FOCAL LENGTH | TELEPHOTO END |
| FOCAL LENGTH f | 16.146 | 29.487 | 53.85 |
| VARIABLE DA | 0.44000 | 8.87257 | 22.67111 |
| VARIABLE DB | 2.87666 | 3.12901 | 4.33617 |
| VARIABLE DC | 19.29016 | 8.43762 | 2.59994 |
| VARIABLE DD | 6.18178 | 3.32394 | 1.65001 |
| VARIABLE DE | 18.11816 | 30.39738 | 42.55296 |
| Bf | 9.76405 | 9.76371 | 9.76319 |

In this case, the values related to the conditions (1), (2) are as follows.

Dg=38.17
Disw=−4.39[%]
Y'=14.3
Fw=16.146
Ft=53.85
Fm: √(Fw×Ft)=29.487
Tlt=126.1

Figure 10:
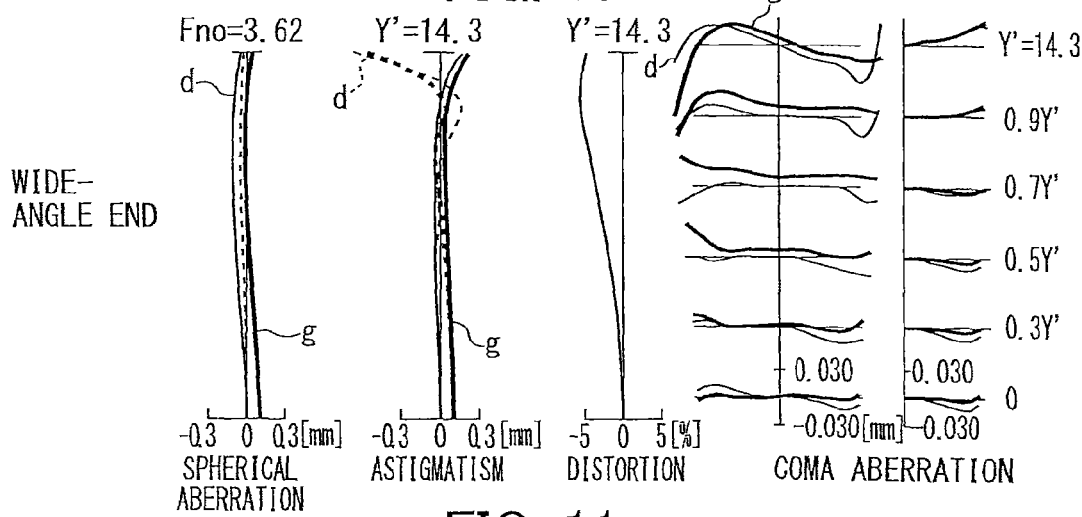
FIG. 10 provides aberration curves illustrating spherical aberration, astigmatism, distortion and coma aberration in the wide-angle end of the zoom lens according to Embodiment 3 illustrated in FIG. 9.
Figure 11:
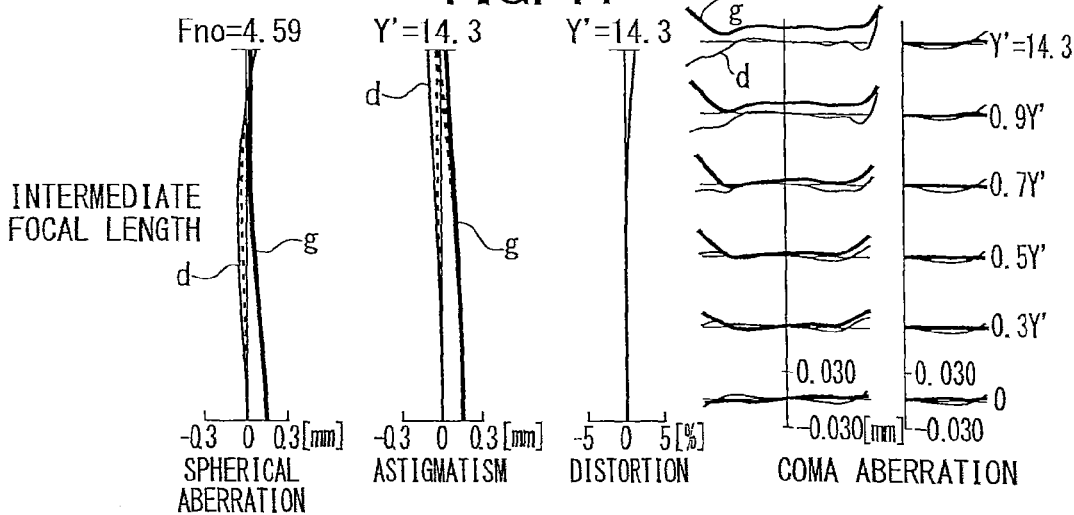
FIG. 11 provides aberration curves illustrating spherical aberration, astigmatism, distortion and coma aberration in the intermediate focal length of the zoom lens according to Embodiment 3 illustrated in FIG. 9.
Figure 12:
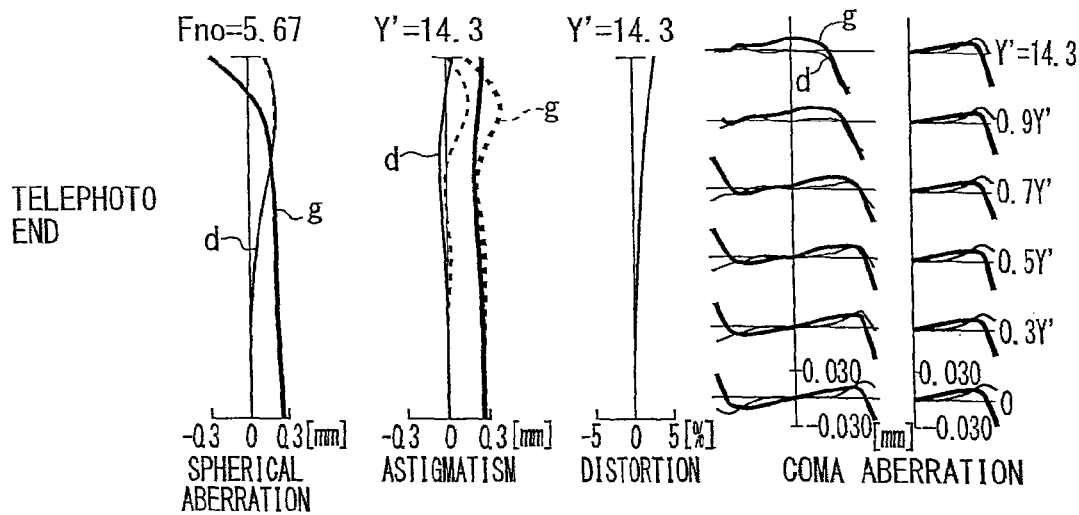
FIG. 12 provides aberration curves illustrating spherical aberration, astigmatism, distortion and coma aberration in the telephoto end of the zoom lens according to Embodiment 3 illustrated in FIG. 9.

|(Dg×Disw)/(Y'×Fm)|=0.004        CONDITION [1]:

Tlt/(Y'·(Ft/Fw))=2.64        CONDITION [1]:

FIGS. 10, 11, 12 are aberration views illustrating a spherical aberration, astigmatism, distortion and coma aberration in the wide-angle end, intermediate focal length and telephoto end, respectively in Embodiment 3. In the respective aberration views, the dashed line in the spherical aberration illustrates a sine condition, the solid line and the dashed line in the astigmatism illustrate sagittal and meridional, respectively. In addition, g and d illustrate g-line and d-line, respectively. These are the same as in the other embodiments.

Embodiment 4

Figure 13:
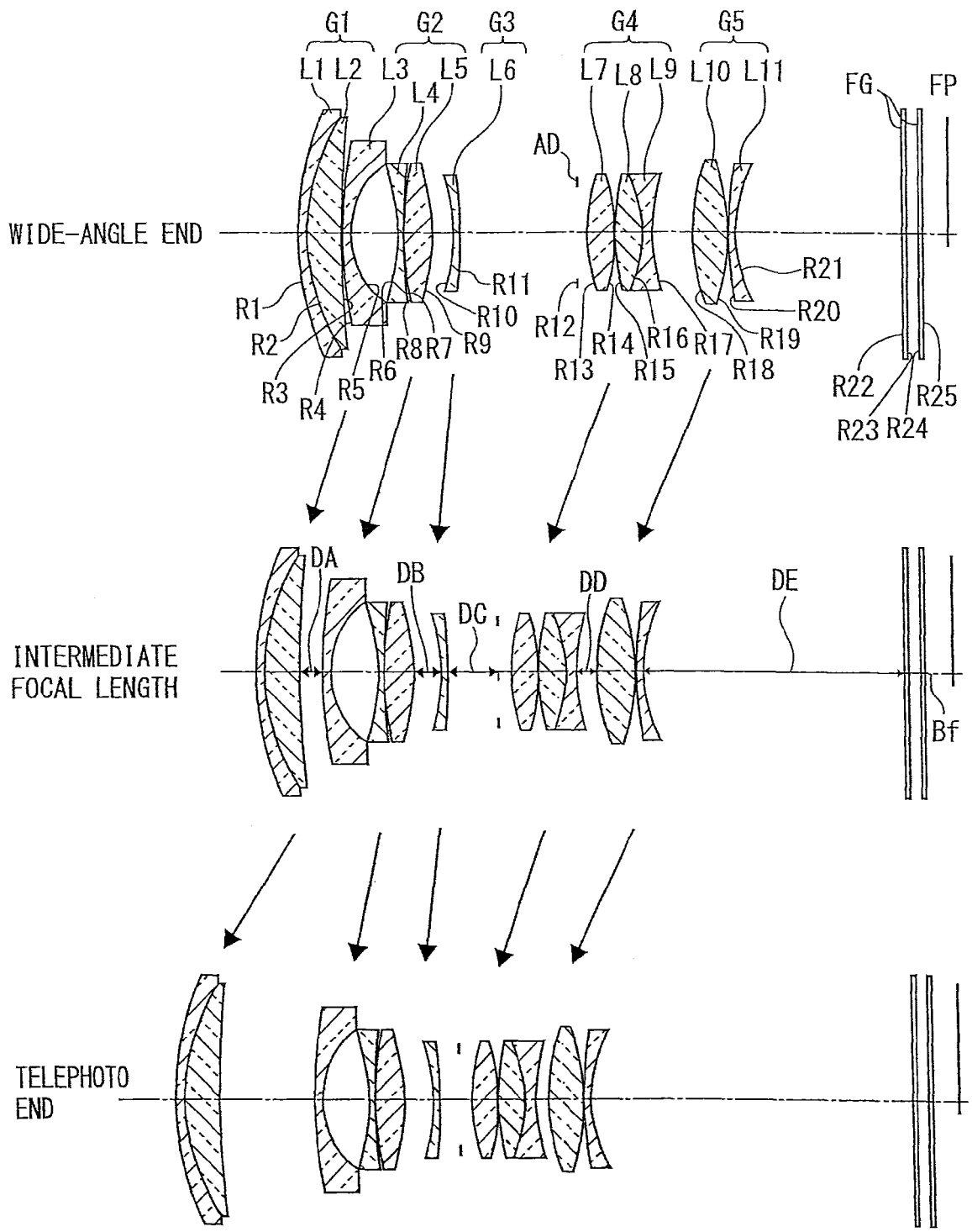
FIG. 13 provides sectional views along an optical axis in a wide-angle end, intermediate focal length and telephoto end, schematically illustrating a configuration of an optical system of a zoom lens and a zoom trajectory in Embodiment 4 according to a fourth embodiment of the present invention.

FIG. 13 provides sectional views along an optical axis in a wide-angle end, intermediate focal length and telephoto end, schematically illustrating a configuration of an optical system of a zoom lens and a zoom trajectory in Embodiment 4 according to the fourth embodiment of the present invention. In addition, in FIG. 13 illustrating the arrangement of lens groups of Embodiment 4, the left side is an object (subject) side.

The zoom lens illustrated in FIG. 13 includes in order from the object side along the optical axis a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and an aperture stop AD disposed between the third and fourth lens groups G3, G4.

The first lens group G1 includes in order from the object side a first lens L1 and second lens L2, the second lens group G2 includes in order from the object side a third lens L3, fourth lens L4, and fifth lens L5, the third lens group G3 includes a single sixth lens L6, the fourth lens group G4 includes in order from the object side a seventh lens L7, eighth lens L8, and ninth lens L9, and the fifth lens group G5 includes in order from the object side a tenth lens L10 and eleventh lens L11.

The first to fifth lens groups G1-G5 are supported by supporting frames or the like which are appropriately common to the respective lens groups. Each lens group integrally moves in zooming. FIG. 13 illustrates surface numbers of the respective optical surfaces. In addition, the respective reference numbers in FIG. 13 are independently used for each embodiment in order to avoid a complicated description due to an increase in the number of reference numbers. Therefore, the configurations are not always the same as those in the other embodiments even if the reference numbers which are common to those in the other embodiments are used.

With a change in a magnification from the wide-angle end (short focus end) to the telephoto end (long focus end), the entire groups of the first to fifth lens groups G1-G5 are moved, so that the interval between the first and second lens groups G1, G2 is increased, the interval between the second and third lens groups G2, G3 is increased, the interval between the third and fourth lens groups G3, G4 is decreased, and the interval between the fourth and fifth lens groups G4, G5 is decreased. The aperture stop AD moves together with the fourth lens group G4.

The first lens group G1 includes in order from the object side the first lens L1 made of a negative meniscus lens having a convex surface on the object side, and the second lens L2 made of a positive meniscus lens having a convex surface on the object side. The first and second lenses L1, L2 are cemented to form a cemented lens.

The second lens group G2 includes in order from the object side the third lens L3 made of a negative meniscus lens having a convex surface on the object side, the fourth lens L4 made of a biconcave lens having in both surfaces thereof an aspheric surface and a concave surface on the object side, which is stronger than that on the image side, and the fifth lens L5 made of a biconvex lens having a convex surface on the image side, which is stronger than that on the object side.

The third lens group G3 includes a single sixth lens L6 made of a negative meniscus lens having a concave surface on the object side.

The aperture stop AD is disposed between the third and fourth lens groups G3, G4, and moves together with the fourth lens group G4 as described above.

The fourth lens group G4 includes in order from the object side the seventh lens L7 made of a biconvex lens having in both surfaces thereof an aspheric surface and a convex surface on the object side, which is stronger than that on the image side, the eighth lens L8 made of a biconvex lens having a convex surface on the image side, which is stronger than that on the object side, and the ninth lens L9 made of a biconcave lens having a concave surface on the object side, which is stronger than that on the image side. The eighth and ninth lenses L8, L9 are cemented to form a cemented lens.

The fifth lens group G5 includes in order from the object side the tenth lens L10 made of a biconvex lens having in both surfaces thereof an aspheric surface and a convex surface on the object side, which is stronger than that on the image side, and the eleventh lens L11 made of a negative meniscus lens having a convex surface on the object side.

In Embodiment 4, the focal length f of the entire optical system, F-number F and half-field angle ω change in the ranges of f=16.195-27.22-45.75, F=3.63-4.95-5.86 and ω=42.7-27.8-16.9 by zooming. The optical properties of the respective optical elements in Embodiment 4 are as illustrated in the following Table 7.

TABLE 7

OPTICAL PROPERTY

| SURFACE NUMBER | CURVATURE RADIUS R | SURFACE INTERVAL D | Nd | vd | REMARK | |
|---|---|---|---|---|---|---|
| 1 | 33.04630 | 1.30000 | 1.84666 | 23.78 | L1 | G1 |
| 2 | 24.61909 | 5.03061 | 1.69680 | 55.53 | L2 | |
| 3 | 136.08670 | VARIABLE DA | | | | |
| 4 | 66.82379 | 0.97000 | 2.00100 | 29.13 | L3 | G2 |
| 5 | 10.13620 | 6.58248 | | | | |
| 6* | −27.08140 | 0.80000 | 1.69350 | 53.18 | L4 | |
| 7* | 42.28382 | 0.10000 | | | | |
| 8 | 36.12687 | 4.06747 | 1.84666 | 23.78 | L5 | |
| 9 | −23.91703 | VARIABLE DB | | | | |
| 10 | −19.22723 | 0.80000 | 1.60300 | 65.44 | L6 | G3 |
| 11 | −40.79376 | VARIABLE DC | | | | |
| 12 | APERTURE STOP (∞) | 1.45000 | | | AD | |
| 13* | 15.53437 | 3.73586 | 1.51633 | 64.06 | L7 | G4 |
| 14* | −28.31772 | 0.10000 | | | | |
| 15 | 26.51545 | 3.96987 | 1.53172 | 48.84 | L8 | |
| 16 | −16.08335 | 1.45000 | 1.83400 | 37.16 | L9 | |
| 17 | 21.49926 | VARIABLE DD | | | | |
| 18* | 18.61811 | 5.28649 | 1.58913 | 61.15 | L10 | G5 |
| 19* | −19.32644 | 0.10000 | | | | |
| 20 | 50.34422 | 0.82401 | 1.90366 | 31.32 | L11 | |
| 21 | 15.67976 | VARIABLE DE | | | | |
| 22 | ∞ | 0.70000 | 1.53770 | 66.60 | FG | |
| 23 | ∞ | 1.50000 | | | | |
| 24 | ∞ | 0.70000 | 1.50000 | 64.00 | | |
| 25 | ∞ | Bf | | | | |

In Table 7, the lens surface having the surface number with * is an aspheric surface. This is the same as in the other embodiments.

Namely, in Table 7, each optical surface of the sixth, seventh, thirteenth, fourteenth, eighteenth, and nineteenth surfaces with * is an aspheric surface, and a parameter (aspheric surface coefficient) of each aspheric surface in Equation (3) is as follows. In addition, in the aspheric surface parameter, "En" denotes "power of 10", namely, "×10ⁿ", for example, "E-05" denotes "×10⁻⁵". This is the same as in the other embodiments.

Aspheric Surface Parameter
Sixth Surface
$K=0$
$A_4=-2.62797E-05$
$A_6=2.15039E-07$
$A_8=1.25881E-09$
$A_{10}=-3.37339E-11$
$A_{12}=-5.96466E-14$
Seventh Surface
$K=0$
$A_4=-6.94415E-05$
$A_6=2.98647E-07$
$A_8=-1.81245E-09$
$A_{10}=-2.26671E-11$
Thirteenth Surface
$K=0$
$A_4=-1.84404E-05$
$A_6=-9.86481E-08$
$A_8=1.21421E-09$
$A_{10}=-2.38227E-11$
Fourteenth Surface
$K=0$
$A_4=9.50545E-06$
$A_6=8.22895E-08$
$A_8=-9.41319E-10$
$A_{10}=-1.57178E-11$
$A_{12}=0$
Eighteenth Surface
$K=-4.00213$
$A_4=5.35275E-06$
$A_6=-6.14576E-08$
$A_8=-3.35757E-09$
$A_{10}=3.63892E-11$
Nineteenth Surface
$K=-0.0203$
$A_4=4.11207E-05$
$A_6=6.45731E-08$
$A_8=-4.12993E-09$
$A_{10}=4.1149E-11$ In Embodiment 4, the focal length f of the entire optical system, the variable interval DA between the first and lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and the filter FG, and the interval such as backfocus between the filter FG and the image surface are changed as shown in the following Table 8 along with zooming.

TABLE 8

| Variable Interval | | | |
|---|---|---|---|
| | WIDE-ANGLE END | INTERMEDIATE FOCAL LENGTH | TELEPHOTO END |
| FOCAL LENGTH f | 16.195 | 27.22 | 45.75 |
| VARIABLE DA | 0.44000 | 3.12474 | 13.64650 |
| VARIABLE DB | 2.92021 | 3.87145 | 4.13333 |
| VARIABLE DC | 16.99152 | 7.10888 | 2.60000 |
| VARIABLE DD | 5.50038 | 2.77435 | 1.65000 |

TABLE 8-continued

| Variable Interval | | | |
|---|---|---|---|
| | WIDE-ANGLE END | INTERMEDIATE FOCAL LENGTH | TELEPHOTO END |
| VARIABLE DE | 23.57753 | 35.89483 | 45.19931 |
| Bf | 3.49801 | 3.49755 | 3.49694 |

In this case, the values related to the conditions (1), (2) are as follows.
Dg=35.12
Disw=−4.3[%]
Y'=14.3
Fw=16.195
Ft=45.75
Fm: √(Fw×Ft)=27.22
Tlt=110.19

Figure 14:
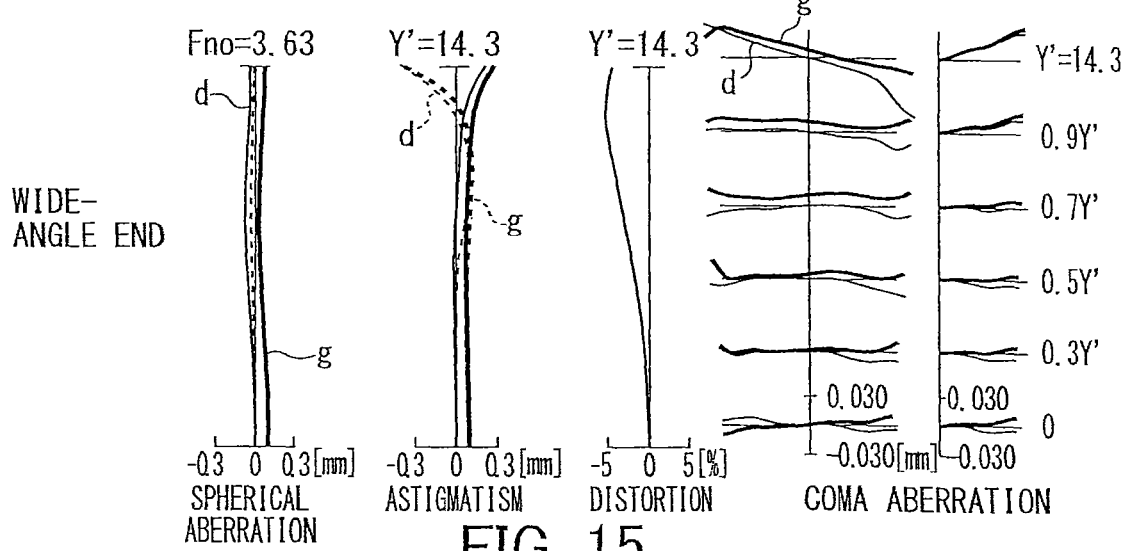
FIG. 14 provides aberration curves illustrating spherical aberration, astigmatism, distortion and coma aberration in the wide-angle end of the zoom lens according to Embodiment 4 illustrated in FIG. 13.
Figure 15:
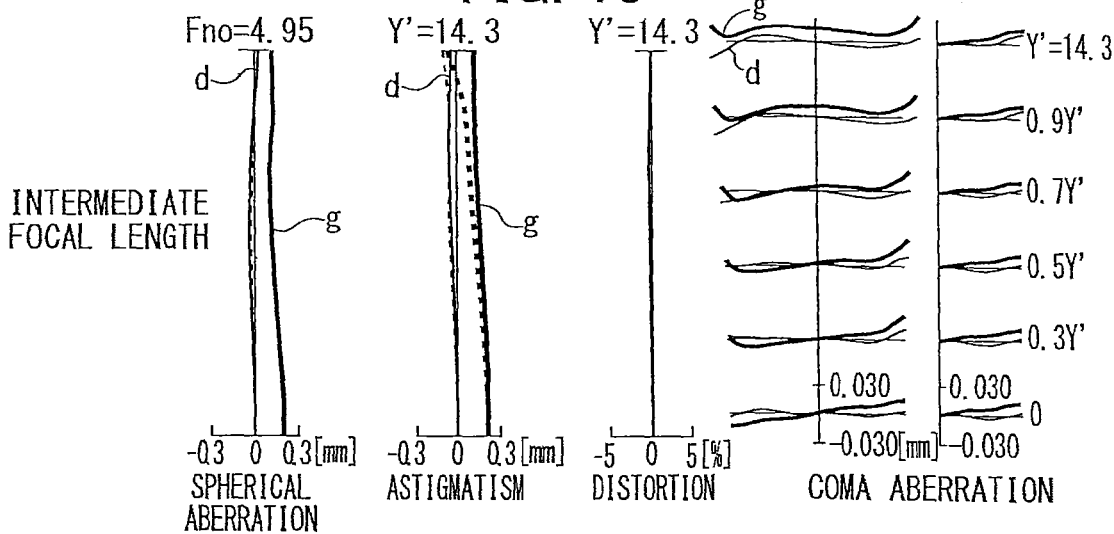
FIG. 15 provides aberration curves illustrating spherical aberration, astigmatism, distortion and coma aberration in the intermediate focal length of the zoom lens according to Embodiment 4 illustrated in FIG. 13.
Figure 16:
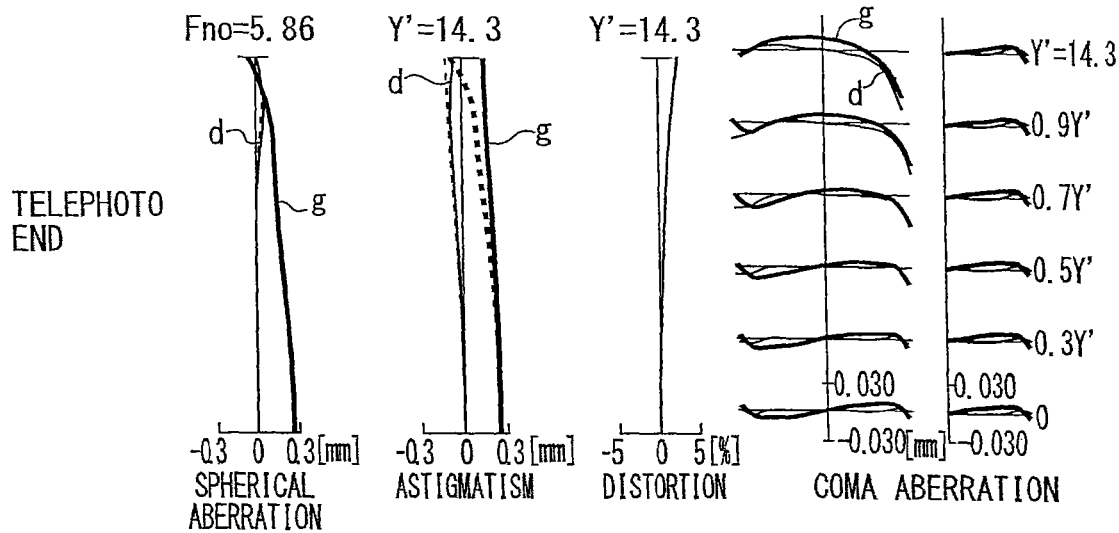
FIG. 16 provides aberration curves illustrating spherical aberration, astigmatism, distortion and coma aberration in the telephoto end of the zoom lens according to Embodiment 4 illustrated in FIG. 13.

|(Dg×Disw)/(Y'×Fm)|0.0039    CONDITION [1]:

Tlt(Y'·(Ft/Fw))=2.73    CONDITION (2):

FIGS. 14, 15, 16 are aberration views illustrating a spherical aberration, astigmatism, distortion and coma aberration in the wide-angle end, intermediate focal length and telephoto end, respectively in Embodiment 4. In the respective aberration views, the dashed line in the spherical aberration illustrates a sine condition, the solid line and the dashed line in the astigmatism illustrate sagittal and meridional, respectively. In addition, g and d illustrate g-line and d-line, respectively. These are the same as in the other embodiments.

Embodiment 5

Figure 17:
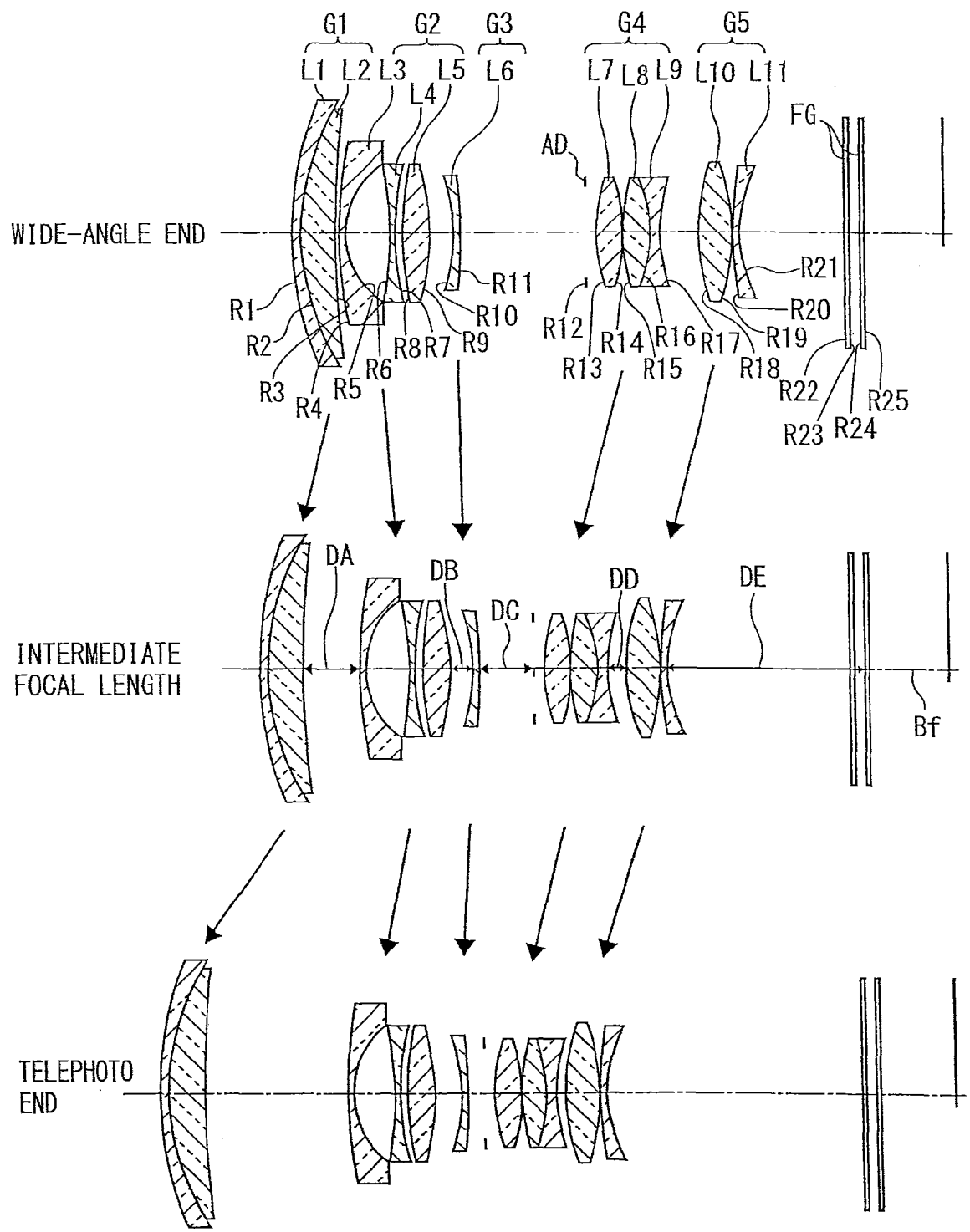
FIG. 17 provides sectional views along an optical axis in a wide-angle end, intermediate focal length and telephoto end, schematically illustrating a configuration of an optical system of a zoom lens and a zoom trajectory in Embodiment 5 according to a fifth embodiment of the present invention.

FIG. 17 provides sectional views along an optical axis in a wide-angle end, intermediate focal length and telephoto end, schematically illustrating a configuration of an optical system of a zoom lens and a zoom trajectory in Embodiment 5 according to the fifth embodiment of the present invention. In addition, in FIG. 17 illustrating the arrangement of lens groups of Embodiment 5, the left side is an object (subject) side.

The zoom lens illustrated in FIG. 17 includes in order from the object side along the optical axis a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and an aperture stop AD disposed between the third and fourth lens groups G3, G4.

The first lens group G1 includes in order from the object side a first lens L1 and second lens L2, the second lens group G2 includes in order from the object side a third lens L3, fourth lens L4, and fifth lens L5, the third lens group G3 includes a single sixth lens L6, the fourth lens group G4 includes in order from the object side a seventh lens L7, eighth lens L8, and ninth lens L9, and the fifth lens group G5 includes in order from the object side a tenth lens L10 and eleventh lens L11.

The first to fifth lens groups G1-G5 are supported by supporting frames or the like which are appropriately common to the respective lens groups. Each lens group integrally moves in zooming. FIG. 17 illustrates surface numbers of the respective optical surfaces. In addition, the respective reference numbers in FIG. 17 are independently used for each embodiment in order to avoid a complicated description due to an increase in the number of reference numbers. Therefore, the configurations are not always the same as those in the other embodiments even if the reference numbers which are common to those in the other embodiments are used.

With a change in a magnification from the wide-angle end (short focus end) to the telephoto end (long focus end), the entire groups of the first to fifth lens groups G1-G5 are moved, so that the interval between the first and second lens groups G1, G2 is increased, the interval between the second and third lens groups G2, G3 is increased after being decreased once, namely, is changed, the interval between the third and fourth lens groups G3, G4 is decreased, and the interval between the fourth and fifth lens groups G4, G5 is decreased. The aperture stop AD moves together with the fourth lens group G4.

The first lens group G1 includes in order from the object side the first lens L1 made of a negative meniscus lens having a convex surface on the object side, and the second lens L2 made of a positive meniscus lens having a convex surface on the object side. The first and second lenses L1, L2 are cemented to form a cemented lens.

The second lens group G2 includes in order from the object side the third lens L3 made of a negative meniscus lens having a convex surface on the object side, the fourth lens L4 made of a biconcave lens having in both surfaces thereof an aspheric surface and a concave surface on the image side, which is stronger than that on the object side, and the fifth lens L5 made of a biconvex lens having a convex surface on the image side, which is stronger than that on the object side.

The third lens group G3 includes a single sixth lens L6 made of a negative meniscus lens having a concave surface on the object side.

The aperture stop AD is disposed between the third and fourth lens groups G3, G4, and moves together with the fourth lens group G4 as described above.

The fourth lens group G4 includes in order from the object side the seventh lens L7 made of a biconvex lens having in both surfaces thereof an aspheric surface and a convex surface on the object side, which is stronger than that on the image side, the eighth lens L8 made of a biconvex lens having a convex surface on the image side, which is stronger than that on the object side, and the ninth lens L9 made of a biconcave lens having a concave surface on the image side, which is stronger than that on the object side. The eighth and ninth lenses L8, L9 are cemented to form a cemented lens.

The fifth lens group G5 includes in order from the object side the tenth lens L10 made of a biconvex lens having in both surfaces thereof an aspheric surface and a convex surface on the object side, which is stronger than that on the image side, and the eleventh lens L11 made of a negative meniscus lens having a convex surface on the object side.

In this case, as illustrated in FIG. 17, with a change in a magnification from the wide-angle end (short focus end) to the telephoto end (long focus end), the first lens group G1 approximately monotonically moves from the image side to the object side, the second lens group G2 approximately moves on the object side to be a trajectory having a convex shape on the image side, the third lens group G3 approximately moves on the object side to be a trajectory having a convex shape on the image side, the aperture stop AD and the fourth lens group G4 approximately move from the image side to the object side, and the fifth lens group G5 approximately moves from the image side to the object side.

In Embodiment 5, the focal length f of the entire optical system, F-number F and half-field angle ω change in the ranges of f=16.146-29.484-53.843, F=3.63-4.64-5.74 and ω=42.8-25.5-14.4 by zooming. The optical properties of the respective optical elements in Embodiment 5 are as illustrated in the following Table 9.

TABLE 9

OPTICAL PROPERTY

| SURFACE NUMBER | CURVATURE RADIUS R | SURFACE INTERVAL D | Nd | νd | REMARK | |
|---|---|---|---|---|---|---|
| 1 | 46.03179 | 1.30005 | 1.84666 | 23.78 | L1 | G1 |
| 2 | 31.22940 | 5.51888 | 1.77250 | 49.60 | L2 | |
| 3 | 152.04501 | VARIABLE DA | | | | |
| 4 | 51.07120 | 0.97002 | 2.00100 | 29.13 | L3 | G2 |
| 5 | 10.77721 | 6.63709 | | | | |
| 6* | −42.16678 | 0.79999 | 1.77030 | 47.40 | L4 | |
| 7* | 38.75553 | 0.96368 | | | | |
| 8 | 30.38725 | 4.33203 | 1.84666 | 23.78 | L5 | |
| 9 | −29.02408 | VARIABLE DB | | | | |
| 10 | −21.91807 | 0.80000 | 1.64850 | 53.02 | L6 | G3 |
| 11 | −79.56447 | VARIABLE DC | | | | |
| 12 | APERTURE STOP (∞) | 1.44994 | | | AD | |
| 13* | 18.62497 | 4.02774 | 1.51633 | 64.06 | L7 | G4 |
| 14* | −25.81393 | 0.09995 | | | | |
| 15 | 20.81187 | 4.01271 | 1.51742 | 52.43 | L8 | |
| 16 | −19.74213 | 1.44999 | 1.83400 | 37.16 | L9 | |
| 17 | 19.22015 | VARIABLE DD | | | | |
| 18* | 20.95766 | 5.30002 | 1.58913 | 61.15 | L10 | G5 |
| 19* | −22.01066 | 0.10001 | | | | |
| 20 | 42.36060 | 0.79999 | 1.90366 | 31.32 | L11 | |
| 21 | 16.44550 | VARIABLE DE | | | | |
| 22 | ∞ | 0.70000 | 1.53770 | 66.60 | FG | |
| 23 | ∞ | 1.50000 | | | | |
| 24 | ∞ | 0.70000 | 1.50000 | 64.00 | | |
| 25 | ∞ | Bf | | | | |

In Table 9, the lens surface having the surface number with * is an aspheric surface. This is the same as in the other embodiments.

Namely, in Table 9, each of the sixth, seventh, thirteenth, fourteenth, eighteenth, and nineteenth surfaces with * is an aspheric surface, and a parameter (aspheric surface coefficient) of each aspheric surface in Equation (3) is as follows. In addition, in the aspheric surface parameter, "En" denotes "power of 10", namely, "×10$^n$", for example, "E-05" denotes "×10$^{-5}$". This is the same as in the other embodiments.

Aspheric Surface Parameter
Sixth Surface
$K=0$
$A_4=5.52979E-05$
$A_6=-1.46723E-06$
$A_8=1.40955E-08$
$A_{10}=-5.75258E-11$
Seventh Surface
$K=0$
$A_4=3.02092E-05$
$A_6=-1.53901E-06$
$A_8=1.44769E-08$
$A_{10}=-6.26901E-11$
Thirteenth Surface
$K=0$
$A_4=-8.40542E-06$
$A_6=-4.37152E-07$
$A_8=1.03740E-08$
$A_{10}=-2.45238E-10$
Fourteenth Surface
$K=0$
$A_4=2.47361E-05$
$A_6=-6.21729E-07$
$A_8=1.37690E-08$
$A_{10}=-2.72842E-10$ Eighteenth Surface
K=−0.92674
$A_4$=−1.83059E−05
$A_6$=−3.30349E−08
$A_8$=−2.28321E−09
$A_{10}$=−6.15846E−13
Nineteenth Surface
K=0
$A_4$=3.19375E−05
$A_6$=3.31577E−08
$A_8$=−2.88956E−09
$A_{10}$=0

In Embodiment 5, the focal length f of the entire optical system, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and the filter FG, and the interval such as backfocus between the filter FG and the image surface are changed as shown in the following Table 10 with zooming.

TABLE 10

Variable Interval

|  | WIDE-ANGLE END | INTERMEDIATE FOCAL LENGTH | TELEPHOTO END |
| --- | --- | --- | --- |
| FOCAL LENGTH f | 16.146 | 29.484 | 53.843 |
| VARIABLE DA | 0.47981 | 8.94913 | 23.54063 |
| VARIABLE DB | 3.46925 | 3.31521 | 4.34035 |
| VARIABLE DC | 18.75306 | 8.22939 | 2.59987 |
| VARIABLE DD | 6.13180 | 2.96958 | 1.64988 |
| VARIABLE DE | 27.35054 | 39.92413 | 52.30469 |
| Bf | 0.50000 | 0.50000 | 0.50000 |

In this case, the values related to the conditions (1), (2) are as follows.
Dg=37.11
Disw=−4.37[%]
Y'=14.3
Fw=16.146
Ft=53.843
Fm: $\sqrt{(Fw \times Ft)}$=29.484
Tlt=126.4

$|(Dg \times Disw)/(Y' \times Fm)/(Y' \times Fm)|$=0.0038   CONDITION [1]:

$Tlt/(Y'(Ft/Fw))$=2.65   CONDITION [2]:

FIGS. 18, 19, 20 are aberration views illustrating a spherical aberration, astigmatism, distortion and coma aberration in the wide-angle end, intermediate focal length and telephoto end, respectively in Embodiment 5. In the respective aberration views, the dashed line in the spherical aberration illustrates a sine condition, the solid line and the dashed line in the astigmatism illustrate sagittal and meridional, respectively. In addition, g and d illustrate g-line and d-line, respectively. These are the same as in the other embodiments.

Embodiment 6

Figure 21:
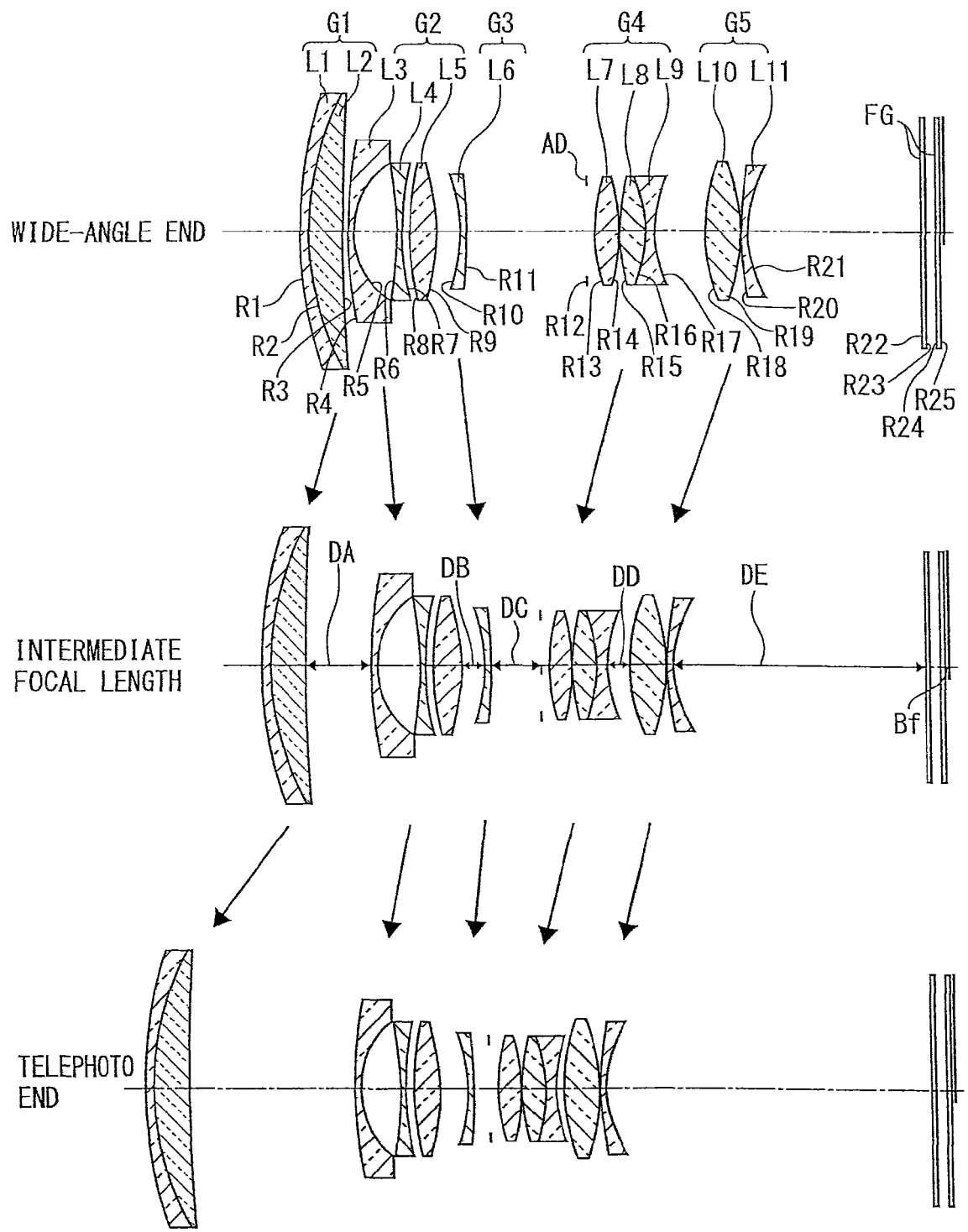
FIG. 21 provides sectional views along an optical axis in a wide-angle end, intermediate focal length and telephoto end, schematically illustrating a configuration of an optical system of a zoom lens and a zoom trajectory in Embodiment 6 according to a sixth embodiment of the present invention.

FIG. 21 provides sectional views along an optical axis in a wide-angle end, intermediate focal length and telephoto end, schematically illustrating a configuration of an optical system of a zoom lens and a zoom trajectory in Embodiment 6 according to the sixth embodiment of the present invention. In addition, in FIG. 21 illustrating the arrangement of lens groups of Embodiment 6, the left side is an object (subject) side.

The zoom lens illustrated in FIG. 21 includes in order from the object side along the optical axis a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and an aperture stop AD disposed between the third and fourth lens groups G3, G4.

The first lens group G1 includes in order from the object side a first lens L1 and second lens L2, the second lens group G2 includes in order from the object side a third lens L3, fourth lens L4, and fifth lens L5, the third lens group G3 includes a single sixth lens L6, the fourth lens group G4 includes in order from the object side a seventh lens L7, eighth lens L8, and ninth lens L9, and the fifth lens group G5 includes in order from the object side a tenth lens L10 and eleventh lens L11.

The first to fifth lens groups G1-G5 are supported by supporting frames or the like which are appropriately common to the respective lens groups. Each lens group integrally moves in zooming. FIG. 21 illustrates surface numbers of the respective optical surfaces. In addition, the respective reference numbers in FIG. 21 are independently used for each embodiment in order to avoid a complicated description due to an increase in the number of reference numbers. Therefore, the configurations are not always the same as those in the other embodiments even if the reference numbers which are common to those in the other embodiments are used.

With a change in a magnification from the wide-angle end (short focus end) to the telephoto end (long focus end), the entire groups of the first to fifth lens groups G1-G5 are moved, so that the interval between the first and second lens groups G1, G2 is increased, the interval between the second and third lens groups G2, G3 is increased after being decreased once, namely, is changed, the interval between the third and fourth lens groups G3, G4 is decreased, and the interval between the fourth and fifth lens groups G4, G5 is decreased. The aperture stop AD moves together with the fourth lens group G4.

The first lens group G1 includes in order from the object side the first lens L1 made of a negative meniscus lens having a convex surface on the object side, and the second lens L2 made of a positive meniscus lens having a convex surface on the object side. The first and second lenses L1, L2 are cemented to form a cemented lens.

The second lens group G2 includes in order from the object side the third lens L3 made of a negative meniscus lens having a convex surface on the object side, the fourth lens L4 made of a biconcave lens having in both surfaces thereof an aspheric surface and a concave surface on the image side, which is stronger than that on the object side, and the fifth lens L5 made of a biconvex lens having a convex surface on the image side, which is slightly stronger than that on the object side.

The third lens group G3 includes a single sixth lens L6 made of a negative meniscus lens having a concave surface on the object side.

The aperture stop AD is disposed between the third and fourth lens groups G3, G4, and moves together with the fourth lens group G4 as described above.

The fourth lens group G4 includes in order from the object side the seventh lens L7 made of a biconvex lens having in both surfaces thereof an aspheric surface and a convex surface on the object side, which is stronger than that on the image side, the eighth lens L8 made of a biconvex lens having in both surfaces thereof the same curvature, and the ninth lens L9 made of a biconcave lens having in both surfaces thereof the same curvature. The eighth and ninth lenses L8, L9 are cemented to form a cemented lens.

The fifth lens group G5 includes in order from the object side the tenth lens L10 made of a biconvex lens having in both surfaces thereof an aspheric surface and a convex surface on the object side, which is stronger than that on the image side, and the eleventh lens L11 made of a negative meniscus lens having a convex surface on the object side.

In this case, as illustrated in FIG. 21, with a change in a magnification from the wide-angle end (short focus end) to the telephoto end (long focus end), the first lens group G1 approximately monotonically moves from the image side to the object side, the second lens group G2 approximately moves to be a trajectory having a convex shape on the image side, the third lens group G3 approximately moves to be a trajectory having a convex shape on the image side, the aperture stop AD and the fourth lens group G4 approximately move from the image side to the object side, and the fifth lens group G5 approximately moves from the image side to the object side.

In Embodiment 6, the focal length f of the entire optical system, F-number F and half-field angle ω change in the ranges of f=16.146-29.486-53.852, F=3.62-4.62-5.77 and ω=42.9-25.4-14.4 by zooming. The optical properties of the respective optical elements in Embodiment 6 are as illustrated in the following Table 11.

TABLE 11

OPTICAL PROPERTY

| SURFACE NUMBER | CURVATURE RADIUS R | SURFACE INTERVAL D | Nd | vd | REMARK | |
|---|---|---|---|---|---|---|
| 1 | 52.97005 | 1.31000 | 1.84666 | 23.78 | L1 | G1 |
| 2 | 35.71101 | 5.48584 | 1.77250 | 49.60 | L2 | |
| 3 | 189.65170 | VARIABLE DA | | | | |
| 4 | 57.34337 | 0.95497 | 2.00100 | 29.13 | L3 | G2 |
| 5 | 11.09490 | 6.36289 | | | | |
| 6* | −52.53144 | 0.80001 | 1.77030 | 47.40 | L4 | |
| 7* | 36.40322 | 1.16039 | | | | |
| 8 | 30.42534 | 4.23829 | 1.84666 | 23.78 | L5 | |
| 9 | −30.42507 | VARIABLE DB | | | | |
| 10 | −22.85191 | 0.80000 | 1.64850 | 53.02 | L6 | G3 |
| 11 | −92.38759 | VARIABLE DC | | | | |
| 12 | APERTURE STOP (∞) | 1.40001 | | | AD | |
| 13* | 19.49107 | 3.32058 | 1.51633 | 64.06 | L7 | G4 |
| 14* | −25.78639 | 0.11538 | | | | |
| 15 | 18.99577 | 4.01733 | 1.51742 | 52.43 | L8 | |
| 16 | −18.99577 | 1.40000 | 1.83400 | 37.16 | L9 | |
| 17 | 18.99577 | VARIABLE DD | | | | |
| 18* | 19.38104 | 5.59999 | 1.58913 | 61.15 | L10 | G5 |
| 19* | −23.21203 | 0.10000 | | | | |
| 20 | 34.69037 | 0.80000 | 1.90366 | 31.32 | L11 | |
| 21 | 14.67162 | VARIABLE DE | | | | |
| 22 | ∞ | 0.70000 | 1.53770 | 66.60 | FG | |
| 23 | ∞ | 1.50000 | | | | |
| 24 | ∞ | 0.70000 | 1.50000 | 64.00 | | |
| 25 | ∞ | Bf | | | | |

In Table 11, the lens surface having the surface number with * is an aspheric surface. This is the same as in the other embodiments.

Namely, in Table 11, each of the sixth, seventh, thirteenth, fourteenth, eighteenth, and nineteenth surfaces with * is an aspheric surface, and a parameter (aspheric surface coefficient) of each aspheric surface in Equation (3) is as follows. In addition, in the aspheric surface parameter, "En" denotes "power of 10", namely, "×10ⁿ", for example, "E-05" denotes "×10⁻⁵". This is the same as in the other embodiments.

Aspheric Surface Parameter
Sixth Surface
$K=0$
$A_4=2.63554E-05$
$A_6=-1.09237E-06$
$A_8=9.8447E-09$
$A_{10}=-3.41409E-11$
Seventh Surface
$K=0$
$A_4=2.93738E-06$
$A_6=-1.13624E-06$
$A_8=1.01043E-08$
$A_{10}=-3.88306E-11$
Thirteenth Surface
$K=0$
$A_4=3.21402E-07$
$A_6=1.03872E-07$
$A_8=6.34622E-09$
$A_{10}=-1.99948E-10$
Fourteenth Surface
$K=0$
$A_4=2.47699E-05$
$A_6=-2.4115E-07$
$A_8=9.50458E-09$
$A_{10}=-2.36136E-10$
Eighteenth Surface
$K=-0.57855$
$A_4=-1.83484E-05$
$A_6=-2.90044E-08$
$A_8=-1.90061E-09$
$A_{10}=-5.50054E-12$
Nineteenth Surface
$K=-0.09961$
$A_4=3.54974E-05$
$A_6=3.43435E-08$
$A_9=-3.14805E-09$ In Embodiment 6, the focal length f of the entire optical system, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and the filter FG, and the interval such as backfocus between the filter FG and the image surface are changed as shown in the following Table 12 along with zooming.

TABLE 12

| | Variable Interval | | |
|---|---|---|---|
| | WIDE-ANGLE END | INTERMEDIATE FOCAL LENGTH | TELEPHOTO END |
| FOCAL LENGTH f | 16.146 | 29.486 | 53.852 |
| VARIABLE DA | 1.00003 | 10.71413 | 26.85616 |
| VARIABLE DB | 3.49515 | 3.27157 | 4.27495 |
| VARIABLE DC | 18.58004 | 8.07056 | 2.49995 |
| VARIABLE DD | 26.45879 | 3.30413 | 1.64995 |
| VARIABLE DE | 26.45879 | 38.93855 | 51.55163 |
| Bf | 0.50000 | 0.50000 | 0.50000 |

In this case, the values related to the conditions (1), (2) are as follows.
Dg=36.47
Disw=−4.37[%]

Y'=14.3
Fw=16.146
Ft=53.852
Fm: √ (Fw×Ft)=29.486
Tlt=128.1

Figure 22:
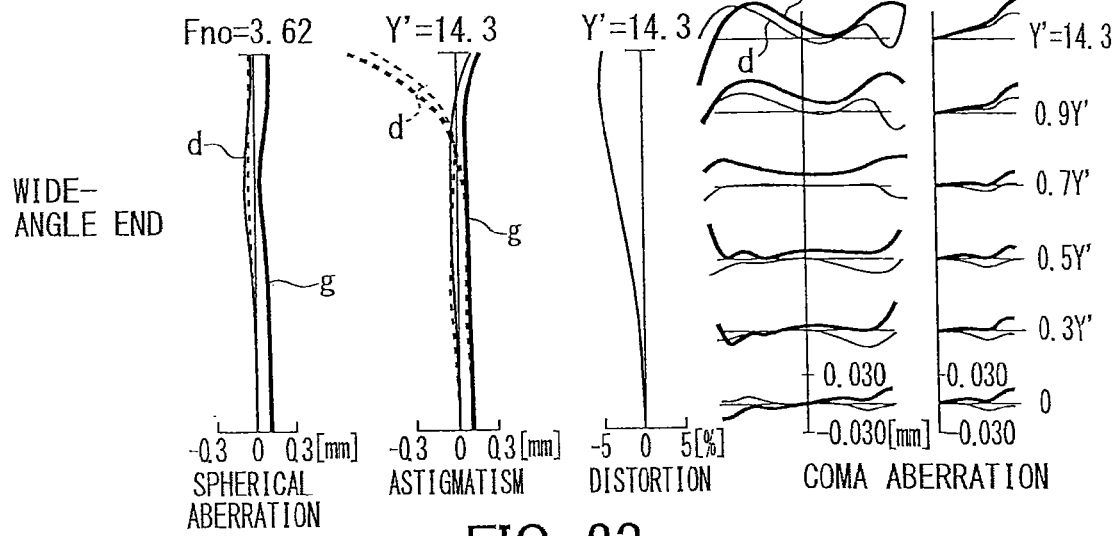
FIG. 22 provides aberration curves illustrating spherical aberration, astigmatism, distortion and coma aberration in the wide-angle end of the zoom lens according to Embodiment 6 illustrated in FIG. 21.
Figure 23:
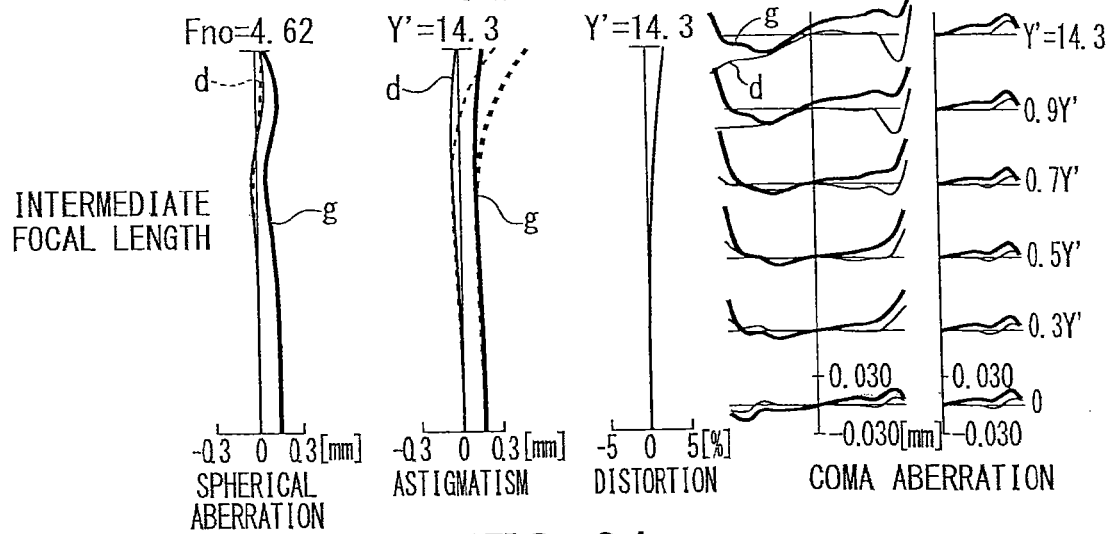
FIG. 23 provides aberration curves illustrating spherical aberration, astigmatism, distortion and coma aberration in the intermediate focal length of the zoom lens according to Embodiment 6 illustrated in FIG. 21.
Figure 24:
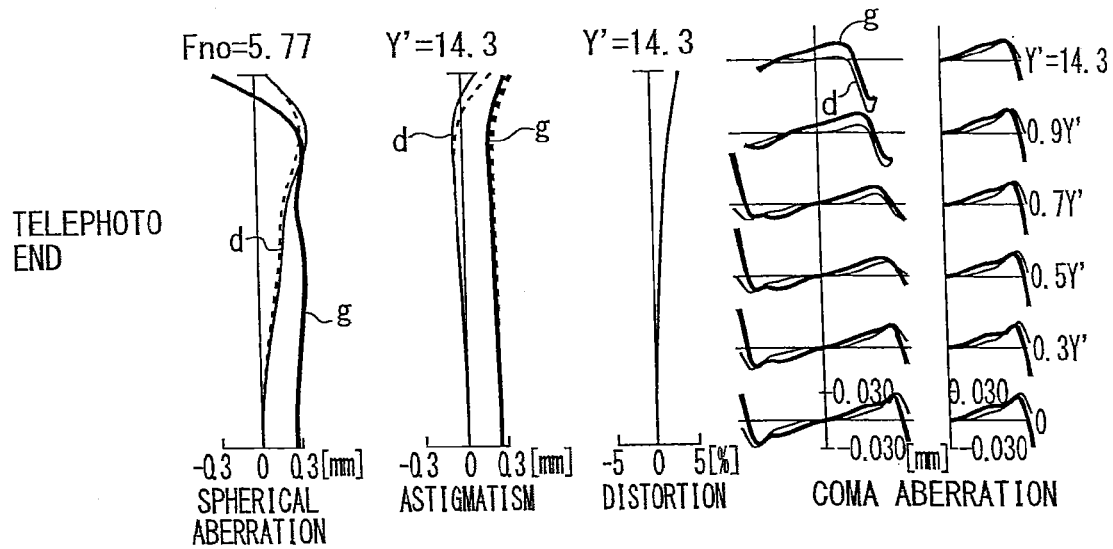
FIG. 24 provides aberration curves illustrating spherical aberration, astigmatism, distortion and coma aberration in the telephoto end of the zoom lens according to Embodiment 6 illustrated in FIG. 21.

|(Dg×Disw)/(Y'×Fm)|=0.0038    CONDITION [1]:

Tlt/(Y'·(Ft/Fw))=2.69    CONDITION [2]:

FIGS. 22, 23, 24 are aberration views illustrating a spherical aberration, astigmatism, distortion and coma aberration in the wide-angle end, intermediate focal length and telephoto end, respectively in Embodiment 6. In the respective aberration views, the dashed line in the spherical aberration illustrates a sine condition, the solid line and the dashed line in the astigmatism illustrate sagittal and meridional, respectively. In addition, g and d illustrate g-line and d-line, respectively. These are the same as in the other embodiments.

Embodiment 7

FIG. 25 provides sectional views along an optical axis in a wide-angle end, intermediate focal length and telephoto end, schematically illustrating a configuration of an optical system of a zoom lens and a zoom trajectory in Embodiment 7 according to the seventh embodiment of the present invention. In addition, in FIG. 25 illustrating the arrangement of lens groups of Embodiment 7, the left side is an object (subject) side.

The zoom lens illustrated in FIG. 25 includes in order from the object side along the optical axis a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and an aperture stop AD disposed between the third and fourth lens groups G3, G4.

The first lens group G1 includes in order from the object side a first lens L1 and second lens L2, the second lens group G2 includes in order from the object side a third lens L3, fourth lens L4, and fifth lens L5, the third lens group G3 includes a single sixth lens L6, the fourth lens group G4 includes in order from the object side a seventh lens L7, eighth lens L8, and ninth lens L9, and the fifth lens group G5 includes in order from the object side a tenth lens L10 and eleventh lens L11.

The first to fifth lens groups G1-G5 are supported by supporting frames or the like which are appropriately common to the respective lens groups. Each lens group integrally moves in zooming. FIG. 25 illustrates surface numbers of the respective optical surfaces. In addition, the respective reference numbers in FIG. 25 are independently used for each embodiment in order to avoid a complicated description due to an increase in the number of reference numbers. Therefore, the configurations are not always the same as those in the other embodiments even if the reference numbers which are common to those in the other embodiments are used.

With a change in a magnification from the wide-angle end (short focus end) to the telephoto end (long focus end), the entire groups of the first to fifth lens groups G1-G5 are moved, so that the interval between the first and second lens groups G1, G2 is increased, the interval between the second and third lens groups G2, G3 is increased after being decreased once, namely, is changed, the interval between the third and fourth lens groups G3, G4 is decreased, and the interval between the fourth and fifth lens groups G4, G5 is decreased. The aperture stop AD moves together with the fourth lens group G4.

The first lens group G1 includes in order from the object side the first lens L1 made of a negative meniscus lens having a convex surface on the object side, and the second lens L2 made of a positive meniscus lens having a convex surface on the object side. The first and second lenses L1, L2 are cemented to form a cemented lens.

The second lens group G2 includes in order from the object side the third lens L3 made of a negative meniscus lens having a convex surface on the object side, the fourth lens L4 made of a biconcave lens having in both surfaces thereof an aspheric surface and a concave surface on the image side, which is stronger than that on the object side, and the fifth lens L5 made of a biconvex lens having in both surfaces thereof the same curvature.

The third lens group G3 includes a single sixth lens L6 made of a negative meniscus lens having a concave surface on the object side.

The aperture stop AD is disposed between the third and fourth lens groups G3, G4, and moves together with the fourth lens group G4 as described above.

The fourth lens group G4 includes in order from the object side the seventh lens L7 made of a biconvex lens having in both surfaces thereof an aspheric surface and a convex surface on the object side, which is stronger than that on the image side, the eighth lens L8 made of a biconvex lens having in both surfaces thereof the same curvature, and the ninth lens L9 made of a biconcave lens having in both surface thereof the same curvature. The eighth and ninth lenses L8, L9 are cemented to form a cemented lens.

The fifth lens group G5 includes in order from the object side the tenth lens L10 made of a biconvex lens having in both surfaces thereof an aspheric surface and a convex surface on the object side, which is stronger than that on the image side, and the eleventh lens L11 made of a negative meniscus lens having a convex surface on the object side.

In this case, as illustrated in FIG. 25, with a change in a magnification from the wide-angle end (short focus end) to the telephoto end (long focus end), the first lens group G1 approximately monotonically moves from the image side to the object side, the second lens group G2 approximately moves to be a trajectory having a convex shape on the image side, the third lens group G3 approximately moves to be a trajectory having a convex shape on the image side, the aperture stop AD and the fourth lens group G4 approximately and monotonically move from the image side to the object side, and the fifth lens group G5 approximately moves from the image side to the object side.

In Embodiment 7, the focal length f of the entire optical system, F-number F and half-field angle ω change in the ranges of f=16.146-29.487-53.852, F=3.61-4.61-5.76 and ω=42.9-25.4-14.4 by zooming. The optical properties of the respective optical elements in Embodiment 7 are as illustrated in the following Table 13.

TABLE 13

OPTICAL PROPERTY

| SURFACE NUMBER | CURVATURE RADIUS R | SURFACE INTERVAL D | Nd | vd | REMARK | |
|---|---|---|---|---|---|---|
| 1 | 53.02258 | 1.31000 | 1.84666 | 23.78 | L1 | G1 |
| 2 | 35.94362 | 5.46329 | 1.77250 | 49.60 | L2 | |
| 3 | 188.67998 | VARIABLE DA | | | | |
| 4 | 54.87412 | 0.95512 | 2.00100 | 29.13 | L3 | G2 |
| 5 | 10.79646 | 6.44587 | | | | |
| 6* | −51.91885 | 0.80000 | 1.74320 | 49.29 | L4 | |

TABLE 13-continued

OPTICAL PROPERTY

| SURFACE NUMBER | CURVATURE RADIUS R | SURFACE INTERVAL D | Nd | vd | REMARK | |
|---|---|---|---|---|---|---|
| 7* | 40.63394 | 1.06371 | | | | |
| 8 | 31.38598 | 4.08243 | 1.84666 | 23.78 | L5 | |
| 9 | −31.38598 | VARIABLE DB | | | | |
| 10 | −23.00149 | 0.80000 | 1.65160 | 58.55 | L6 | G3 |
| 11 | −97.40089 | VARIABLE DC | | | | |
| 12 | APERTURE STOP (∞) | 1.39999 | | | AD | |
| 13* | 19.57334 | 3.29549 | 1.51633 | 64.06 | L7 | G4 |
| 14* | −25.26589 | 0.10000 | | | | |
| 15 | 19.46405 | 3.89071 | 1.51742 | 52.43 | L8 | |
| 16 | −19.46405 | 1.40519 | 1.83400 | 37.16 | L9 | |
| 17 | 19.46405 | VARIABLE DD | | | | |
| 18* | 19.69818 | 5.60000 | 1.58913 | 61.15 | L10 | G5 |
| 19* | −22.10614 | 0.10000 | | | | |
| 20 | 38.97349 | 0.80019 | 1.90366 | 31.32 | L11 | |
| 21 | 15.14672 | VARIABLE DE | | | | |
| 22 | ∞ | 0.70000 | 1.53770 | 66.60 | FG | |
| 23 | ∞ | 1.50000 | | | | |
| 24 | ∞ | 0.70000 | 1.50000 | 64.00 | | |
| 25 | ∞ | Bf | | | | |

In Table 13, the lens surface having the surface number with * is an aspheric surface. This is the same as in the other embodiments.

Namely, in Table 13, each of the sixth, seventh, thirteenth, fourteenth, eighteenth and nineteenth surfaces with * is an aspheric surface, and a parameter (aspheric surface coefficient) of each aspheric surface in Equation (3) is as follows. In addition, in the aspheric surface parameter, "En" denotes "power of 10", namely, "×10$^n$", for example, "E-05" denotes "×10$^{-5}$". This is the same as in the other embodiments.

Aspheric Surface Parameter
Sixth Surface
$K=0$
$A_4=3.46877E-05$
$A_6=-1.27443E-06$
$A_8=1.11921E-08$
$A_{10}=-4.40045E-11$
Seventh Surface
$K=0$
$A_4=6.8617E-06$
$A_5=-1.34447E-06$
$A_8=1.13537E-08$
$A_{10}=-4.81564E-11$
Thirteenth Surface
$K=0$
$A_4=-1.2513E-06$
$A_6=-4.84014E-08$
$A_8=5.40686E-09$
$A_{10}=-2.0620E-10$
Fourteenth Surface
$K=0$
$A_4=2.71708E-05$
$A_6=-2.3373E-07$
$A_8=9.93932E-09$
$A_{10}=-2.54318E-10$
Eighteenth Surface
$K=-0.65075$
$A_4=-1.90482E-05$
$A_6=-3.34777E-08$
$A_8=-1.71693E-09$
$A_{10}=-5.56274E-12$
Nineteenth Surface
$K=-0.20854$
$A_4=3.63343E-05$
$A_6=2.45318E-08$
$A_8=-2.95008E-09$ In Embodiment 7, the focal length f of the entire optical system, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and the filter FG, and the interval such as backfocus between the filter FG and the image surface are changed as shown in the following Table 14 with zooming.

TABLE 14

| | Variable Interval | | |
|---|---|---|---|
| | WIDE-ANGLE END | INTERMEDIATE FOCAL LENGTH | TELEPHOTO END |
| FOCAL LENGTH f | 16.146 | 29.487 | 53.852 |
| VARIABLE DA | 1.00003 | 10.81399 | 27.00555 |
| VARIABLE DB | 3.56892 | 3.23901 | 4.21342 |
| VARIABLE DC | 18.19944 | 7.95884 | 2.50002 |
| VARIABLE DD | 7.23212 | 3.33550 | 1.65001 |
| VARIABLE DE | 26.76503 | 39.32439 | 52.06792 |
| Bf | 0.50000 | 0.50000 | 0.50000 |

In this case, the values related to the conditions (1), (2) are as follows.
Dg=36.11
Disw=−4.8[%]
φ=38.4
Y'=14.3
Fw=16.146
Ft=53.852
Fm: √(Fw×Ft)=29.487
Tlt=128.35

$|(Dg \times Disw)/(Y' \times Fm)|=0.0041$      CONDITION [1]:

$Tlt/(Y' \cdot (Ft/Fw))=2.69$      CONDITION [2]:

FIGS. 26, 27, 28 are aberration views illustrating a spherical aberration, astigmatism, distortion and coma aberration in the wide-angle end, intermediate focal length and telephoto end, respectively in Embodiment 7.

In the respective aberration views, the dashed line in the spherical aberration illustrates a sine condition, the solid line and the dashed line in the astigmatism illustrate sagittal and meridional, respectively. In addition, g and d illustrate g-line and d-line, respectively. These are the same as in the other embodiments.

Embodiment 8

Figure 29:
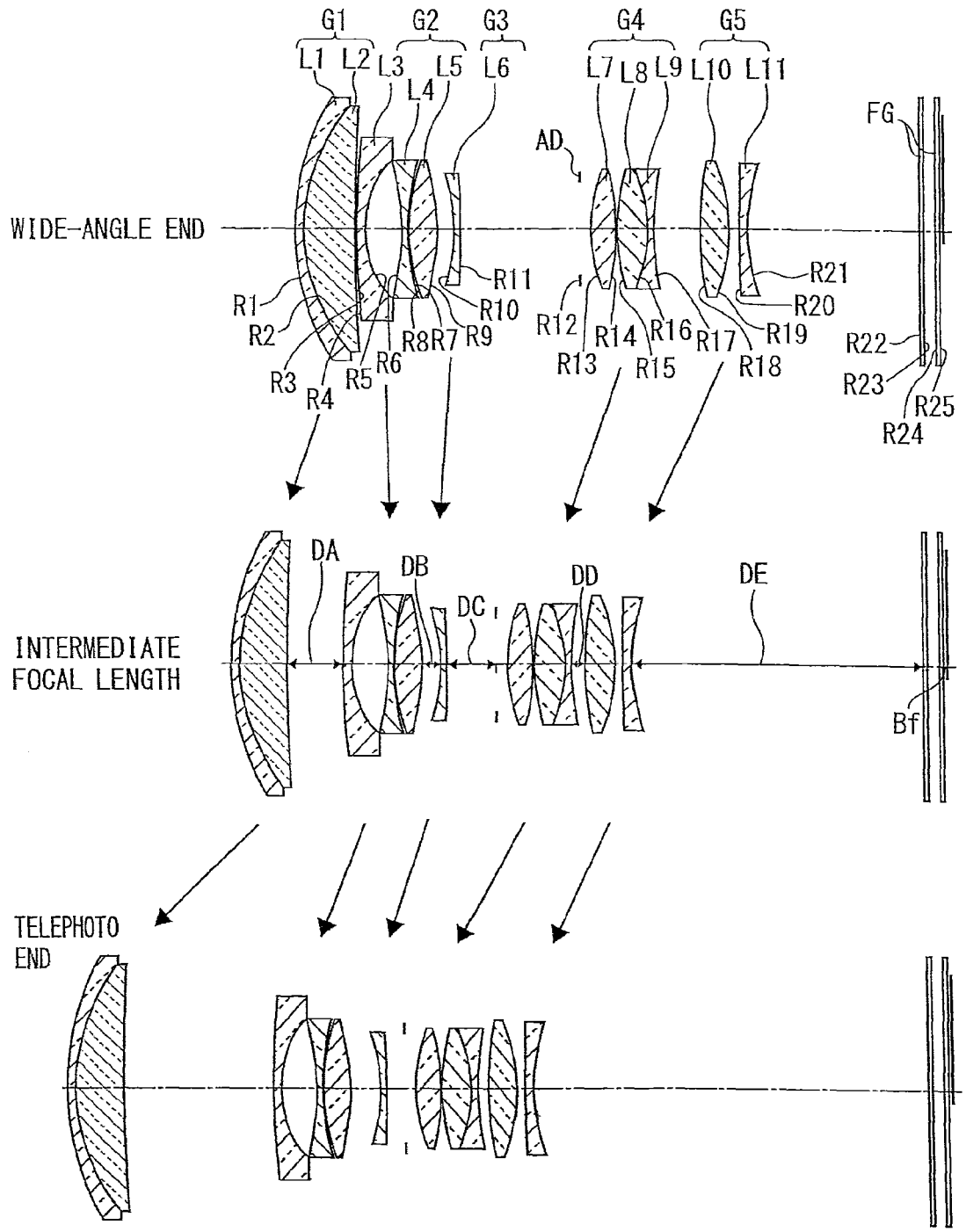
FIG. 29 provides sectional views along an optical axis in a wide-angle end, intermediate focal length and telephoto end, schematically illustrating a configuration of an optical system of a zoom lens and a zoom trajectory in Embodiment 8 according to an eighth embodiment of the present invention.

FIG. 29 provides sectional views along an optical axis in a wide-angle end, intermediate focal length and telephoto end, schematically illustrating a configuration of an optical system of a zoom lens and a zoom trajectory in Embodiment 8 according to the eighth embodiment of the present invention. In addition, in FIG. 29 illustrating the arrangement of lens groups of Embodiment 8, the left side is an object (subject) side.

The zoom lens illustrated in FIG. 29 includes in order from the object side along the optical axis a first lens group G1 having a positive refractive power, a second lens group G2 having a negative refractive power, a third lens group G3 having a negative refractive power, a fourth lens group G4 having a positive refractive power, a fifth lens group G5 having a positive refractive power, and an aperture stop AD disposed between the third and fourth lens groups G3, G4.

The first lens group G1 includes in order from the object side a first lens L1 and second lens L2, the second lens group G2 includes in order from the object side a third lens L3, fourth lens L4, and fifth lens L5, the third lens group G3 includes a single sixth lens L6, the fourth lens group G4 includes in order from the object side a seventh lens L7, eighth lens L8, and ninth lens L9, and the fifth lens group G5 includes in order from the object side a tenth lens L10 and eleventh lens L11.

The first to fifth lens groups G1-G5 are supported by supporting frames or the like which are appropriately common to the respective lens groups. Each lens group integrally moves in zooming. FIG. 29 illustrates surface numbers of the respective optical surfaces. In addition, the respective reference numbers in FIG. 29 are independently used for each embodiment in order to avoid a complicated description due to an increase in the number of reference numbers. Therefore, the configurations are not always the same as those in the other embodiments even if the reference numbers which are common to those in the other embodiments are used.

With a change in a magnification from the wide-angle end (short focus end) to the telephoto end (long focus end), the entire groups of the first to fifth lens groups G1-G5 are moved, so that the interval between the first and second lens groups G1, G2 is increased, the interval between the second and third lens groups G2, G3 is increased, the interval between the third and fourth lens groups G3, G4 is decreased, and the interval between the fourth and fifth lens groups G4, G5 is decreased. The aperture stop AD moves together with the fourth lens group G4.

The first lens group G1 includes in order from the object side the first lens L1 made of a negative meniscus lens having a convex surface on the object side, and the second lens L2 made of a positive meniscus lens having a convex surface on the object side. The first and second lenses L1, L2 are cemented to form a cemented lens.

The second lens group G2 includes in order from the object side the third lens L3 made of a negative meniscus lens having a convex surface on the object side, the fourth lens L4 made of a biconcave lens having in both surfaces thereof an aspheric surface and a concave surface on the image side, which is stronger than that on the object side, and the fifth lens L5 made of a biconvex lens having a convex surface on the object side, which is stronger than that on the image side.

The third lens group G3 includes a single sixth lens L6 made of a negative meniscus lens having a concave surface on the object side.

The aperture stop AD is disposed between the third and fourth lens groups G3, G4, and moves together with the fourth lens group G4 as described above.

The fourth lens group G4 includes in order from the object side the seventh lens L7 made of a biconvex lens having in both surfaces thereof an aspheric surface and a convex surface on the object side, which is stronger than that on the image side, the eighth lens L8 made of a biconvex lens having a convex surface on the image side which is stronger than that on the object side, and the ninth lens L9 made of a biconcave lens having a concave surface on the object side, which is stronger than that on the image side. The eighth and ninth lenses L8, L9 are cemented to form a cemented lens.

The fifth lens group G5 includes in order from the object side the tenth lens L10 made of a biconvex lens having in both surfaces thereof an aspheric surface and a convex surface on the image side, which is stronger than that on the object side, and the eleventh lens L11 made of a negative meniscus lens having a convex surface on the object side.

In Embodiment 8, the focal length f of the entire optical system, F-number F and half-field angle ω change in the ranges of f=16.146-35.034-76.013, F=3.71-515-5.9 and ω=42.2-221-10.4 by zooming. The optical properties of the respective optical elements in Embodiment 8 are as illustrated in the following Table 15.

TABLE 15

OPTICAL PROPERTY

| SURFACE NUMBER | CURVATURE RADIUS R | SURFACE INTERVAL D | Nd | vd | REMARK | |
|---|---|---|---|---|---|---|
| 1 | 27.99516 | 1.20000 | 2.00069 | 25.46 | L1 | G1 |
| 2 | 20.34803 | 6.48544 | 1.64850 | 53.02 | L2 | |
| 3 | 197.37892 | VARIABLE DA | | | | |
| 4 | 117.23872 | 0.90000 | 2.00069 | 25.46 | L3 | G2 |
| 5 | 11.13220 | 5.03945 | | | | |
| 6* | −26.16803 | 0.80000 | 1.59201 | 67.02 | L4 | |
| 7* | 24.43191 | 0.10000 | | | | |
| 8 | 20.23882 | 3.86567 | 1.84666 | 23.78 | L5 | |
| 9 | −26.15917 | VARIABLE DB | | | | |
| 10 | −15.97996 | 0.80000 | 1.60300 | 65.44 | L6 | G3 |
| 11 | −271.17889 | VARIABLE DC | | | | |
| 12 | APERTURE STOP (∞) | 1.45000 | | | AD | |
| 13* | 14.92746 | 3.52761 | 1.48749 | 70.23 | L7 | G4 |
| 14* | −22.93304 | 0.10000 | | | | |
| 15 | 24.54258 | 4.13843 | 1.61293 | 37.00 | L8 | |
| 16 | −14.01260 | 0.80000 | 1.90366 | 31.32 | L9 | |
| 17 | 30.42604 | VARIABLE DD | | | | |
| 18* | 25.58371 | 4.05682 | 1.51633 | 64.06 | L10 | G5 |
| 19* | −16.14012 | 1.18248 | | | | |
| 20 | 309.78754 | 1.08803 | 1.80100 | 34.97 | L11 | |
| 21 | 18.94423 | VARIABLE DE | | | | |
| 22 | ∞ | 0.70000 | 1.53770 | 66.60 | FG | |
| 23 | ∞ | 1.50000 | | | | |
| 24 | ∞ | 0.70000 | 1.50000 | 64.00 | | |
| 25 | ∞ | Bf | | | | |

In Table 15, the lens surface having the surface number with "*" is an aspheric surface. This is the same as in the other embodiments.

Namely, in Table 15, each of the sixth, seventh, thirteenth, fourteenth, eighteenth and nineteenth surfaces with * is an aspheric surface, and a parameter (aspheric surface coefficient) of each aspheric surface in Equation (3) is as follows. In addition, in the aspheric surface parameter, "En" denotes "power of 10", namely, "×10$^n$", for example, "E-05" denotes "×10$^{-5}$". This is the same as in the other embodiments.

Aspheric Surface Parameter
Sixth Surface
K=0
$A_4$=−6.39394E-05
$A_6$=2.46847E-06
$A_8$=−2.94708E-08
$A_{10}$=1.51592E-10
$A_{12}$=−2.50091E-15
Seventh Surface
K=0
$A_4$=−7.74001E-05
$A_6$=2.32671E-06
$A_8$=−2.98594E-08
$A_{10}$=1.43427E-10

Thirteenth Surface
K=0
$A_4$=−1.97861E-05
$A_6$=−2.19267E-07
$A_8$=6.77009E-09
$A_{10}$=−6.54436E-11
Fourteenth Surface
K=0
$A_4$=2.13782E-05
$A_6$=−1.49270E-07
$A_8$=5.86710E-09
$A_{10}$=−6.00601E-11
Eighteenth Surface
K=−5.29445E+00
$A_4$=−5.73091E-05
$A_6$=−1.32029E-07
$A_8$=−7.86855E-09
$A_{10}$=1.07998E-10
Nineteenth Surface
K=4.82700E-01
$A_4$=5.09348E-05
$A_6$=9.38692E-08
$A_8$=−6.87162E-09
$A_{10}$=8.75418E-11
$A_{12}$=2.09729E-13

In Embodiment 8, the focal length f of the entire optical system, the variable interval DA between the first and second lens groups G1, G2, the variable interval DB between the second and third lens groups G2, G3, the variable interval DC between the third lens group G3 and the aperture stop AD, the variable interval DD between the fourth and fifth lens groups G4, G5, the variable interval DE between the fifth lens group G5 and the filter FG, and the interval such as backfocus between the filter FG and the image surface are changed as shown in the following Table 16 along with zooming.

TABLE 16

| | Variable Interval | | |
|---|---|---|---|
| | WIDE-ANGLE END | INTERMEDIATE FOCAL LENGTH | TELEPHOTO END |
| FOCAL LENGTH f | 16.146 | 35.034 | 76.013 |
| VARIABLE DA | 0.44000 | 7.90199 | 21.14000 |
| VARIABLE DB | 2.32291 | 2.72049 | 4.07408 |
| VARIABLE DC | 16.17085 | 7.26356 | 2.75000 |
| VARIABLE DD | 6.15799 | 2.23036 | 1.65001 |
| VARIABLE DE | 22.774 | 40.50325 | 55.38939 |
| Bf | 0.50000 | 0.50000 | 0.50000 |

In this case, the values related to the conditions (1), (2) are as follows.
Dg=34.084
Disw=−11.2[%]
Y'=13
Fw=16.146
Ft=75.986
Fm: √(Fw×Ft)=35.026
Tlt=124.02

|(Dg×Disw)/(Y'×Fm)|0.0084  CONDITION [1]:

Tlt/[Y'·(Ft/Fw)]=2.03  CONDITION [2]:

FIGS. 30, 31, 32 are aberration views illustrating a spherical aberration, astigmatism, distortion and coma aberration in the wide-angle end, intermediate focal length and telephoto end, respectively in Embodiment 8.

In the respective aberration views, the dashed line in the spherical aberration illustrates a sine condition, the solid line and the dashed line in the astigmatism illustrate sagittal and meridional, respectively. In addition, g and d illustrate g-line and d-line, respectively. These are the same as in the other embodiments.

Therefore, the values of the conditions (1), (2) in the respective Embodiments 1-8 are as illustrated in the following Table 17.

TABLE 17

| | CONDITION [1] | CONDITION [2] |
|---|---|---|
| EMBODIMENT 1 | 0.0035 | 2.5 |
| EMBODIMENT 2 | 0.0041 | 2.67 |
| EMBODIMENT 3 | 0.004 | 2.64 |
| EMBODIMENT 4 | 0.0039 | 2.73 |
| EMBODIMENT 5 | 0.0038 | 2.65 |
| EMBODIMENT 6 | 0.0038 | 2.69 |
| EMBODIMENT 7 | 0.0041 | 2.69 |
| EMBODIMENT 8 | 0.0084 | 2.03 |

As described above, in the zoom lens of each of Embodiments 1-8, the parameter values related to the conditions (1), (2) are within the ranges of the conditions.

Ninth Embodiment

Figure 33:
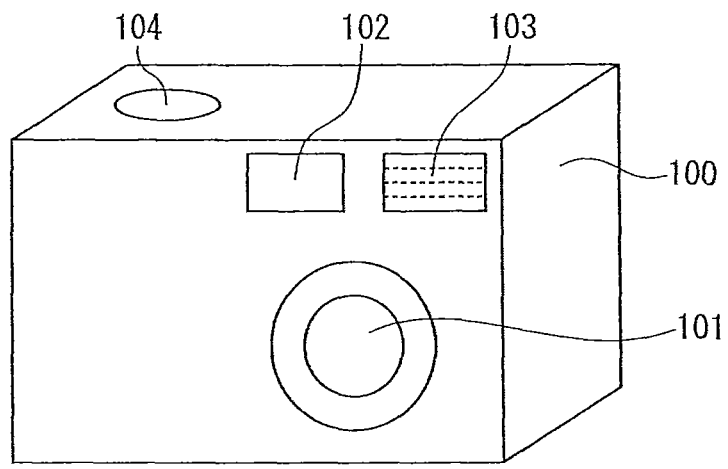
FIG. 33 is a perspective view schematically illustrating an external appearance configuration of a digital camera as an imaging device according to a ninth embodiment of the present invention as seen from an object side.
Figure 34:
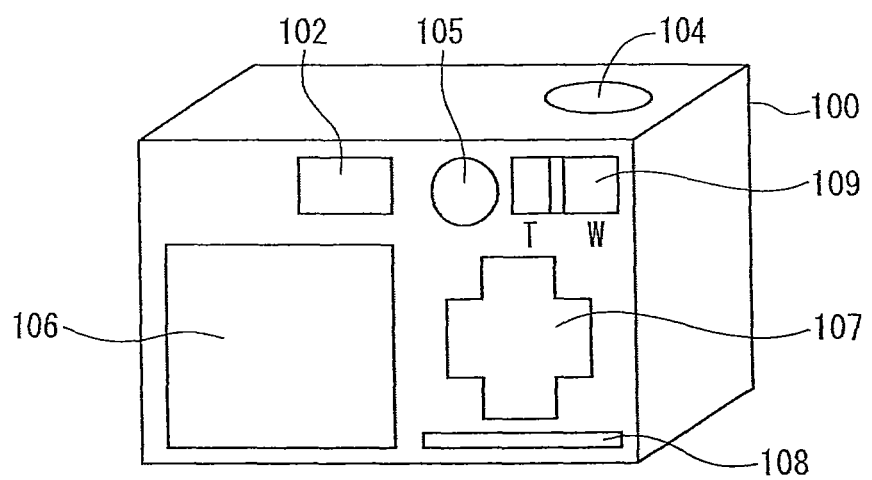
FIG. 34 is a perspective view schematically illustrating the external appearance configuration of the digital camera in FIG. 33 as seen from a photographer's side.
Figure 35:
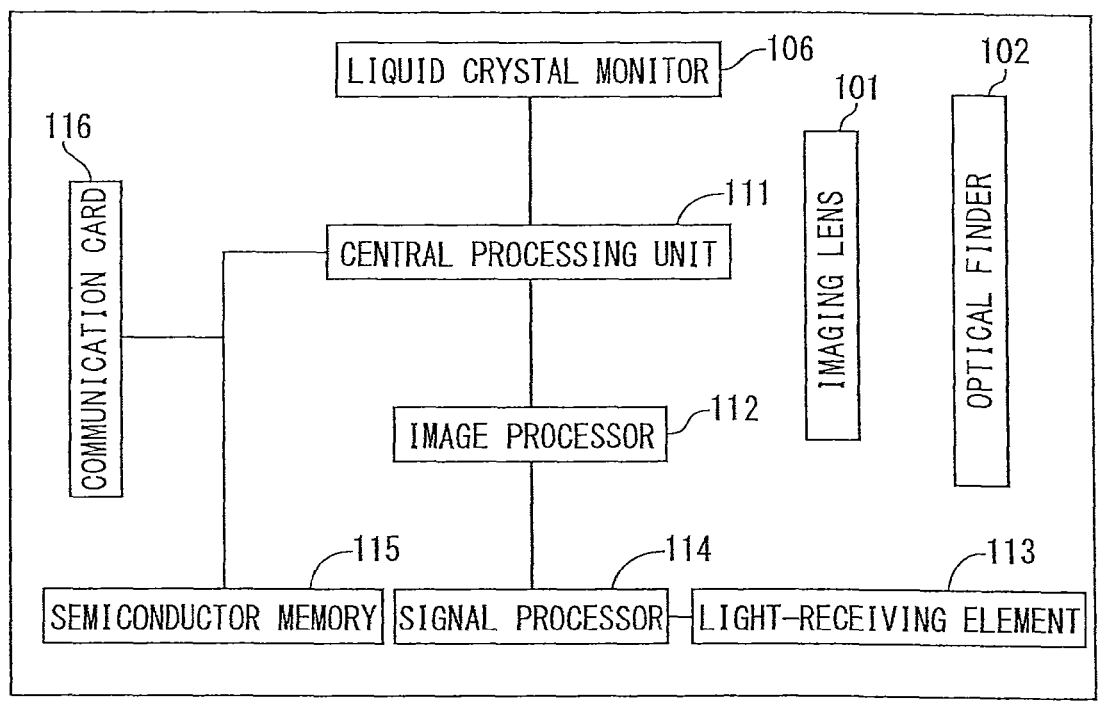
FIG. 35 is a block diagram illustrating the configuration of the digital camera in FIGS. 33, 34.

Next, an imaging device according to the ninth embodiment of the present invention will be described with reference to FIGS. 33-35. The imaging device of this embodiment adopts the zoom lens as described in Embodiments 1-8 according to the first to eighth embodiments of the present invention as an imaging optical system. FIG. 33 is a perspective view schematically illustrating an external appearance configuration of a digital camera as an imaging device according to the ninth embodiment of the present invention as seen from the object side. FIG. 34 is perspective view schematically illustrating the external appearance configuration of the digital camera as seen from a photographer's side. FIG. 35 is a block diagram schematically illustrating the functional configuration of the digital camera. In addition, in FIGS. 33-35, a digital camera as an imaging device is described, but an imaging function corresponding to a digital camera is often incorporated not only in an imaging device mainly dedicated for imaging such as a film camera or video camera but also in various information devices including a portable digital device such as a mobile phone or PDA (personal digital assistant) and also a portable digital device such as a smart phone (registered trademark) or tablet terminal. Such information devices include functions and configurations which are the same as those in a digital camera although their external appearances slightly differ. The zoom lens according to the first to eighth embodiments of the present invention can be used in such information devices as an imaging optical system.

As illustrated in FIGS. 33, 34, the digital camera includes in a camera body 100 an imaging lens 101, optical finder 102, strobe (electronic flash light) 103, shutter button 104, power source switch 105, liquid crystal monitor 106, operation button 107, memory card slot 108, and zoom switch 109. As illustrated in FIG. 35, the digital camera includes in the camera body 100 a central processing unit (CPU) 111, image processor 112, light-receiving element 113, signal processor 114, semiconductor memory 115 and communication card 116.

The digital camera includes the imaging lens 101 as an imaging optical system and the light-receiving element 113 as an image sensor using a CMOS or CCD. The subject optical image imaged by the imaging lens 101 is read by the light-receiving element 113. As the imaging lens 101, the zoom lens according to the first to eighth embodiments described in Embodiments 1-8 is used.

The output of the light-receiving element 113 is processed by the signal processor 114 which is controlled by the central processing unit 111 to be converted into digital image information. After a predetermined image process is performed on the image information digitized by the signal processor 114 in the image processor 112 which is controlled by the central processing unit 111, the image information is recorded in a semiconductor memory 115 such as a non-volatile memory. In this case, the semiconductor memory 115 can be a memory card provided in the memory card slot 108, or can be an on-board semiconductor memory built in the digital camera main body. The liquid crystal monitor 106 is able to display an image in photographing, or display an image recorded in the semiconductor memory 115. The image recorded in the semiconductor memory 115 can be sent outside through the communication card 116 provided in a not-shown communication card slot (can be memory card slot 108).

The objective surface of the imaging lens 101 is covered by a not-shown lens barrier when carried. The lens barrier opens in response to the turning-on operation of the power source switch 105 by a user, and the objective surface is exposed. In this case, the optical systems of the respective groups constituting the zoom lens are the arrangement of the wide-angle end (short focus end), for example, in the lens barrel of the imaging lens 101. The arrangement of the respective optical systems is changed upon the operation of the zoom switch 109, so that the magnification can be changed to the telephoto end (long focus end) through the intermediate focal length. In addition, it is preferable for the optical system of the optical finder 102 to change its magnification in accordance with a change in an angle of view of the imaging lens 101.

In many cases, the focusing is performed by the half-pressing operation of the shutter button 104. The focusing of the zoom lens according to the first to eighth embodiments of the present invention (zoom lens described in Embodiments 1-8) can be performed by the movement of a part of the optical systems of a plurality of lens groups constituting the zoom lens. The shooting is performed by the full-pressing operation of the shutter button 104. After that, the above-described processes are conducted.

When displaying an image recorded in the semiconductor memory 115 on the liquid crystal monitor 106, or sending the image outside through the communication card 116, the operation button 107 is operated as determined. The semiconductor memory 115 and the communication card 116 are provided in a dedicated or general slot such as the memory card slot 109 or a communication card slot.

The imaging lens 101 using the zoom lens as in the first to eighth embodiments (Embodiments 1-8) can be used in an information device having an imaging device such as the above-described digital camera or an imaging function similar to the above-described digital camera as the imaging optical system. Accordingly, an information device such as a portable digital device having an imaging device such as a compact high quality digital camera using a light-receiving element having more than 10 million pixels or an imaging function similar to the imaging device can be achieved.

The configuration of the zoom lens according to the first to eighth embodiments of the present invention can be used as a projection lens of a projector or a shooting lens of a conventional film camera.

Although the embodiments of the present invention have been described above, the present invention is not limited thereto. It should be appreciated that variations may be made in the embodiments described by persons skilled in the art without departing from the scope of the present invention.

According to the embodiments of the present invention, a zoom lens which is suitable for a compact and high performance digital camera or the like, is able to increase an AF speed, downsize a driving system required for an AF operation, and achieve resolution corresponding to an imaging element having more than 10 million pixels can be provided, and a compact and high performance imaging device and portable digital device using such a zoom lens as an imaging optical system can be also provided.

What is claimed is:

1. A zoom lens comprising, in order from an object side along an optical axis:
   a first lens group having a positive refractive power;
   a second lens group having a negative refractive power;
   a third lens group having a negative refractive power;
   a fourth lens group having a positive refractive power; and
   a fifth lens group having a positive refractive power,
   wherein
   with a change in a magnification from a wide-angle end to a telephoto end, an interval between the first lens group and the second lens group is increased, the interval between the second lens group and the third lens group is changed, the interval between the third lens group and the fourth lens group is decreased, the interval between the fourth lens group and the fifth lens group is decreased, and focusing is performed by the third lens group, and
   the following condition (1) is satisfied where a summation of thickness of each of the first to fifth lens groups in the optical axis direction is Dg, a distortion in the wide-angle end in infinity focusing is Disw, an image height is Y', and an intermediate focal length Fm is Fm=√(Fw× Ft) where a focal length in the wide-angle end is Fw and a focal length in the telephoto end is Ft $$3\times10^{-3} < |(Dg \times Disw)/(Y' \times Fm)| < 1\times10^{-2} \quad [1].$$

2. The zoom lens according to claim 1, wherein an aperture stop is disposed between the third lens group and the fourth lens group.

3. The zoom lens according to claim 1, wherein the fourth lens group and the fifth lens include four elements or below in total where a cemented lens is counted as one element and a non-cemented individual lens is counted as one element.

4. The zoom lens according to claim 1, wherein a lens group including the fourth lens group and the fifth lens group includes at least one cemented lens.

5. The zoom lens according to claim 1, wherein the fourth lens group and the fifth lens group include an aspheric surface in one lens or more constituting each of the fourth lens group and the fifth lens group.

6. The zoom lens according to claim 1, wherein the second lens group includes an aspheric surface in one lens or more constituting the second lens group.

7. The zoom lens according to claim 6, wherein the second lens group includes an aspheric surface in a second lens or a subsequent lens counted from the object side in one lens or more constituting the second lens group.

8. The zoom lens according to claim 1, wherein the first lens group consists of two lenses.

9. The zoom lens according to claim 1, wherein the third lens group consists of one negative lens.

10. The zoom lens according to claim 1, wherein the following condition (2) is satisfied where an entire length of an optical system in the telephoto end is Tlt, an image height is Y', a focal length in the wide-angle end is Fw, and a focal length in the telephoto end is Ft $$2 < Tlt/(Y' \cdot (Ft/Fw)) < 3 \qquad [2].$$

11. An imaging device comprising the zoom lens according to claim 1 as an imaging optical system.

12. A portable digital device comprising the zoom lens according to claim 1 as an imaging optical system of an imaging operation part.

\* \* \* \* \*